US008549323B2

(12) United States Patent
Ueda et al.

(10) Patent No.: US 8,549,323 B2
(45) Date of Patent: Oct. 1, 2013

(54) INFORMATION PROCESSING APPARATUS, INFORMATION RECORDING MEDIUM, INFORMATION PROCESSING METHOD, AND COMPUTER PROGRAM

(75) Inventors: Kenjiro Ueda, Kanagawa (JP); Kazuo Yamamoto, Chiba (JP)

(73) Assignee: Sony Corporation, Tokyo (JP)

( * ) Notice: Subject to any disclaimer, the term of this patent is extended or adjusted under 35 U.S.C. 154(b) by 221 days.

(21) Appl. No.: 12/967,982

(22) Filed: Dec. 14, 2010

(65) Prior Publication Data

US 2011/0149708 A1 Jun. 23, 2011

(30) Foreign Application Priority Data

Dec. 18, 2009 (JP) ............................... P2009-288020

(51) Int. Cl.
*G06F 11/30* (2006.01)

(52) U.S. Cl.
USPC .......................................................... 713/189

(58) Field of Classification Search
USPC ............................................. 386/94; 369/84
See application file for complete search history.

(56) References Cited

U.S. PATENT DOCUMENTS

2007/0065101 A1* 3/2007 Takashima ...................... 386/94

FOREIGN PATENT DOCUMENTS

JP 2008-84445 4/2008
JP 2008-98765 4/2008
JP 4140624 6/2008

* cited by examiner

*Primary Examiner* — Kambiz Zand
*Assistant Examiner* — Abiy Getachew
(74) *Attorney, Agent, or Firm* — Finnegan Henderson Farabow Garrett & Dunner LLP

(57) ABSTRACT

An information processing apparatus includes: a data processing unit that generates data for copy of data recorded on an information recording medium, wherein the information recording medium has a configuration in which data encrypted by applying an individual unit key in unit of a unit, which is segment data corresponding to an individual title, is recorded, and the data processing unit acquires title information recorded in copy processing information acquired from the information recording medium or a management server, acquires a unit key corresponding to the acquired title information, and executes decryption processing in unit of the unit by the acquired unit key to generate the data for copy.

11 Claims, 17 Drawing Sheets

| INDEX | CONTENT MANAGING UNIT (CPS) | UNIT KEY (CPS UNIT KEY) |
|---|---|---|
| TITLE 1 | CPS1 | Ku1 |
| TITLE 2 | CPS2 | Ku2 |
| TITLE 3 | CPS3 | Ku3 |
| : | : | : |
| TITLE n | CPSn | Kun |

FIG.1

| INDEX | CONTENT MANAGING UNIT (CPS) | UNIT KEY (CPS UNIT KEY) |
|---|---|---|
| TITLE 1 | CPS1 | Ku1 |
| TITLE 2 | CPS2 | Ku2 |
| TITLE 3 | CPS3 | Ku3 |
| : | : | : |
| TITLE n | CPSn | Kun |

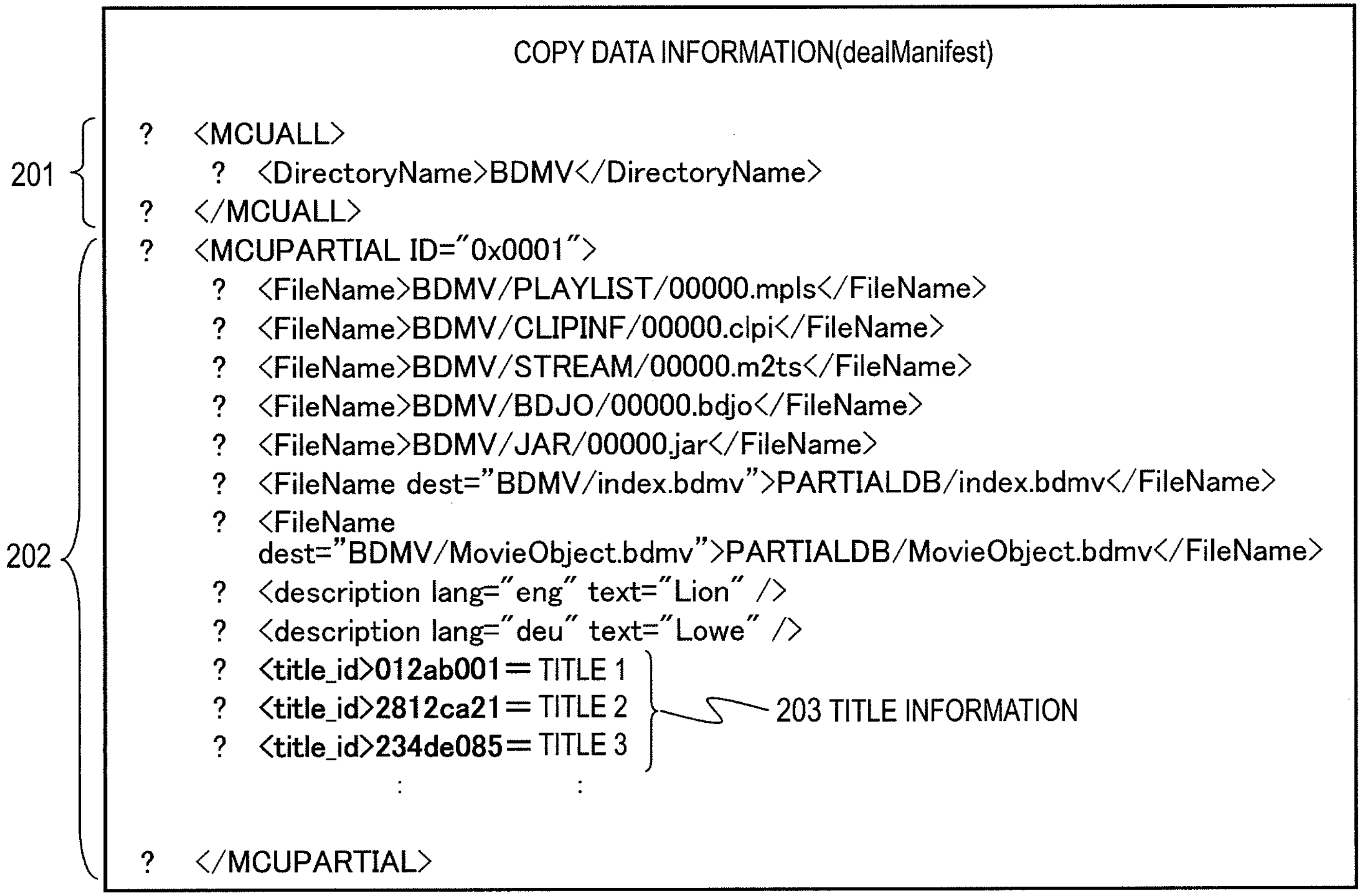

FIG.5

COPY DATA INFORMATION(dealManifest)

```
<MCUALL>
?   <DirectoryName>BDMV</DirectoryName>
</MCUALL>
<MCUPARTIAL ID="0x0001">
?   <FileName>BDMV/PLAYLIST/00000.mpls</FileName>
?   <FileName>BDMV/CLIPINF/00000.clpi</FileName>
?   <FileName>BDMV/STREAM/00000.m2ts</FileName>
?   <FileName>BDMV/BDJO/00000.bdjo</FileName>
?   <FileName>BDMV/JAR/00000.jar</FileName>
?   <FileName dest="BDMV/index.bdmv">PARTIALDB/index.bdmv</FileName>
?   <FileName dest="BDMV/MovieObject.bdmv">PARTIALDB/MovieObject.bdmv</FileName>
?   <description lang="eng" text="Lion" />
?   <description lang="deu" text="Lowe" />
?   <title_id>012ab001 = TITLE 1
?   <title_id>2812ca21 = TITLE 2
?   <title_id>234de085 = TITLE 3
    ..
</MCUPARTIAL>
```

201 — `<MCUALL>` ... `</MCUALL>`

202 — `<MCUPARTIAL ...>` ... `</MCUPARTIAL>`

203 TITLE INFORMATION

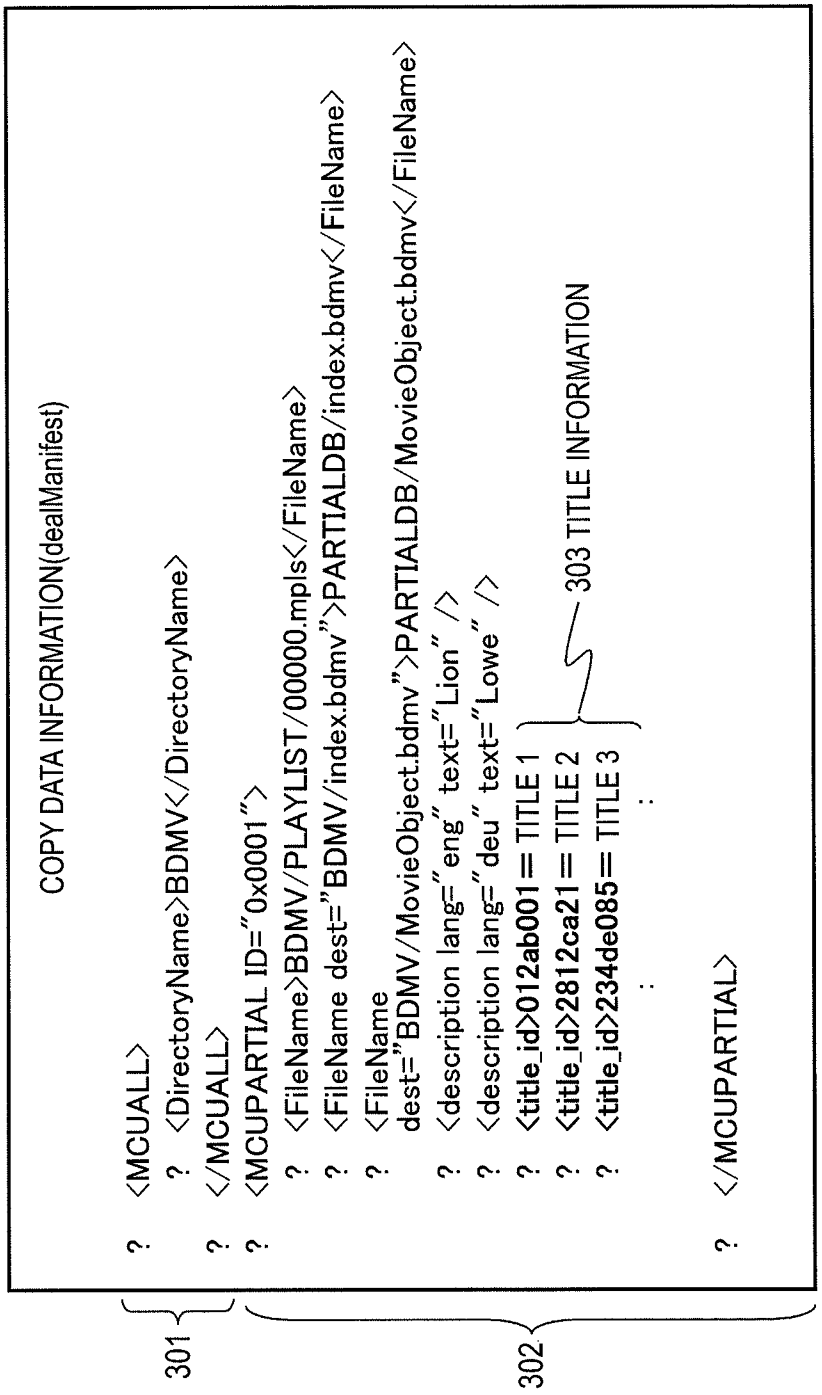

FIG.9

```
COPY DATA INFORMATION(dealManifest)

?   <MCUALL>
?     <DirectoryName>BDMV</DirectoryName>
?   </MCUALL>
?   <MCUPARTIAL ID="0x0001">
?     <FileName>BDMV/PLAYLIST/00000.mpls</FileName>
?     <FileName dest="BDMV/index.bdmv">PARTIALDB/index.bdmv</FileName>
?     <FileName dest="BDMV/MovieObject.bdmv">PARTIALDB/MovieObject.bdmv</FileName>
?     <description lang="eng" text="Lion" />
?     <description lang="deu" text="Lowe" />
?     <title_id>012ab001 = TITLE 1
?     <title_id>2812ca21 = TITLE 2                    303 TITLE INFORMATION
?     <title_id>234de085 = TITLE 3
        :
?   </MCUPARTIAL>
```

301 — <MCUALL> block

302 — <MCUPARTIAL> block

INFORMATION PROCESSING APPARATUS, INFORMATION RECORDING MEDIUM, INFORMATION PROCESSING METHOD, AND COMPUTER PROGRAM

BACKGROUND OF THE INVENTION

1. Field of the Invention

The present invention relates to an information processing apparatus, an information recording medium, an information processing method, and a computer program, and, more particularly to an information processing apparatus, an information recording medium, an information processing method, and a computer program for copying, under predetermined management, data recorded on a medium (an information recording medium) such as a disk.

2. Description of the Related Art

As information recording media for various contents such as movies and music, recently, a DVD (Digital Versatile Disc), a BD (Blu-ray Disc (registered trademark)), and the like are often used. Concerning most of contents such as music data and image data recorded on the information recording media, creators, distributors, and the like have copyright and distribution right. Therefore, even a user who purchases a disk is subjected to fixed limitation on use of contents recorded on the disk. For example, the user is not allowed to unlimitedly copy the disk recorded content to another medium such as a disk.

As a copy management configuration for such media stored content, there is known a copy permission processing configuration for permitting copying on condition that copy permission information is received from a management server. Specifically, processing is performed according to a sequence explained below.

A user inserts a medium such as a content storing disk into a user apparatus such as a PC or a recording and reproducing apparatus and connects the user apparatus to the management server. Thereafter, the user apparatus transmits information specified in advance such as a disk identifier (ID) to the server. After confirming propriety and the like of the received information, the server transmits copy permission information to the user apparatus. The user apparatus can start copy processing on condition that the copy permission information is received from the server.

Such a copy management configuration is called managed copy (MC). Details of the managed copy are described in, for example, JP-A-2008-98765.

On the other hand, as a standard concerning a copyright protection technique for contents, there is an AACS (Advanced Access Content System) standard. Most of contents recorded on disks such as a BD conforming to the AACS standard are recorded as encrypted contents. As a representative encryption configuration of the AACS standard, there is a configuration for sectioning contents into units and applying a different encryption key to each of the units. By adopting such an encryption configuration, it is possible to perform content use control in unit of the unit. Various kinds of strict content use control are realized.

The unit as a segmentation unit for contents is called CPS unit. An encryption key applied to encryption processing and decryption processing of each CPS unit is called CPS unit key, unit key, or title key.

Concerning the AACS standard, please refer to http://www.aacsla.com/home, http://www.aacsla.com/specifications, and the like.

When encrypted content to which a different encryption key is applied in unit of the unit is read out from a disk and copied to another medium such as a disk, processing for once decrypting the encrypted content to be copied and, thereafter, executing re-encryption conforming to a standard of a management system corresponding to the medium at a copy destination to record the content is often performed. In other words, the content is recorded as use control content on the medium at the copy destination as well.

In this case, when a content management system at the copy source (a first management system) and the content management system at the copy destination (a second management system) are different, it is necessary to once decrypt the encrypted content at the copy source and perform processing conforming to the content management system at the copy destination (the second management system), for example, re-encryption performed by using another encryption key to record the content.

In this way, in content copy processing, it is necessary to perform processing in the following sequence:

(1) readout of encrypted content from a first medium (a copy source medium);

(2) decryption processing of the encrypted content conforming to a first management system corresponding to the first medium (the copy source medium);

(3) encryption processing of the content conforming to a second management system corresponding to a second medium (a copy destination medium); and (4) recording processing for recording the encrypted content on the second medium (the copy destination medium).

When recorded content on the first medium (the copy source medium) is the encrypted content in unit of the unit, it is necessary to specify structure units of content, sequentially acquire unit keys corresponding to the specified units, and perform decryption processing of the units.

When the copy processing is performed under the copy management on condition that the copy permission information is received from the server, the user apparatus has to apply a unit key in unit of the unit and perform decryption. However, there is no effective rule for the user apparatus to obtain information for specifying a unit. Therefore, it is difficult to smoothly execute the copy processing of encrypted content in unit of the unit.

As the content to be copied, there are contents of various types.

An example of the content is reproduction path designated content for setting a reproduction path corresponding to an information processing apparatus and causing the information processing apparatus to execute reproduction according to the reproduction path.

Another example of the content is content code applied content for verifying a reproduction sequence executed in a reproducing apparatus, executing check by applying a code (a content code) for verifying whether reproduction processing is executed according to a correct reproduction procedure, and then allowing the reproduction processing.

The reproduction path designated content is described in JP-A-2008-84445. The content code applied content is described in Japanese Patent No. 4140624.

When copy processing of the contents of the various types is performed, unless processing adapted to the content types is performed, it is difficult to perform normal copy processing.

SUMMARY OF THE INVENTION

Therefore, it is desirable to provide an information processing apparatus, an information recording medium, an information processing method, and a computer program that enable quick copy processing of encrypted content in unit of a unit and realize copy processing corresponding to various content types.

According to an embodiment of the present invention, there is provided an information processing apparatus including a data processing unit that generates data for copy of data recorded on an information recording medium. The information recording medium has a configuration in which data encrypted by applying an individual unit key in unit of a unit, which is segment data corresponding to an individual title, is recorded. The data processing unit acquires title information recorded in copy processing information acquired from the information recording medium or a management server, acquires a unit key corresponding to the acquired title information, and executes decryption processing in unit of the unit by the acquired unit key to generate the data for copy.

In one embodiment of the information processing apparatus according to the invention, when recorded data of the information recording medium is reproduction path designated content for performing reproduction conforming to a reproduction path selected according to the information processing apparatus, the data processing unit may generate a segment key applied to decryption of a part of data forming the reproduction path and generates the data for copy according to decryption processing performed by using the generated segment key and the unit key.

In one embodiment of the information processing apparatus according to the invention, the data processing unit may acquire, according to processing to which a sequence key stored in a memory of the information processing apparatus is applied, identification information of a play list for enabling reproduction conforming to the reproduction path, read out a play list file corresponding to the reproduction path from the information recording medium by applying the acquired identification information, and execute readout of data corresponding to the reproduction path by applying the play list.

In one embodiment of the information processing apparatus according to the invention, the data processing unit may read out a play list file corresponding to the reproduction path from the information recording medium by applying a play list file name recorded in the copy processing information.

In one embodiment of the information processing apparatus according to the invention, when recorded data of the information recording medium is content code applied content including code information for executing verification processing for reproduction processing or conversion processing of reproduced data in data reproduction in the information processing apparatus, after executing processing to which the code information is applied, the data processing unit may execute generation processing of the data for copy.

In one embodiment of the information processing apparatus according to the invention, the data processing unit may start generation processing of the data for copy on condition that an instruction for copy execution is input in a data reproduction period after application processing of the code information.

In one embodiment of the information processing apparatus according to the invention, the data processing unit may acquire a unit key identifier referring to the title and a unit key management table including corresponding data of unit key identification information and acquire a unit key from a unit key file, in which unit keys are stored, by applying the acquired unit key identifier.

According to another embodiment of the present invention, there is provided an information recording medium having stored thereon encrypted data encrypted by applying a different unit key in unit of a unit, a unit key management table in which titles and unit key identifiers are associated, a unit key file in which unit keys are stored, and copy processing information in which identification information of the titles is recorded. The information recording medium makes it possible to, in an information processing apparatus that executes data-for-copy generation processing of the encrypted data, acquire a unit key identifier from the unit key management table using the identification information of the titles recorded in the copy processing information, acquire a unit key corresponding to a copy target unit from the unit key file using the acquired unit key identifier, and perform decryption of the copy target unit.

According to still another embodiment of the present invention, there is provided an information processing system including: an information processing apparatus that generates data for copy of data recorded on an information recording medium; and a management server that provides copy permission information for the information processing apparatus. The information recording medium has a configuration in which data encrypted by applying an individual unit key in unit of a unit, which is segment data corresponding to an individual title, is recorded. The management server provides, in response to a request from the information processing apparatus, the information processing apparatus with copy processing information in which identification information of the tile is recorded. The information processing apparatus acquires title information recorded in the copy processing information acquired from the server, acquires a unit key corresponding to the acquired title information, and executes decryption processing in unit of the unit by the acquired unit key to generate the data for copy.

According to yet another embodiment of the present invention, there is provided an information processing method for generating data for copy of data recorded on an information recording medium in an information processing apparatus. The information recording medium has a configuration in which data encrypted by applying an individual unit key in unit of a unit, which is segment data corresponding to an individual title, is recorded. The information processing method includes: a data processing unit of the information processing apparatus acquiring title information recorded in copy processing information acquired from the information recording medium or a management server; and the data processing unit acquiring a unit key corresponding to the acquired title information and executing decryption processing in unit of the unit by the acquired unit key to generate the data for copy.

According to still yet another embodiment of the present invention, there is provided a computer program for causing an information processing apparatus to generate data for copy of data recorded on an information recording medium. The information recording medium has a configuration in which data encrypted by applying an individual unit key in unit of a unit, which is segment data corresponding to an individual title, is recorded. The computer program causes a data processing unit of the information processing apparatus to acquire title information recorded in copy processing information acquired from the information recording medium or a management server; acquire a unit key corresponding to the acquired title information; and execute decryption processing in unit of the unit by the acquired unit key to generate the data for copy.

The computer program according to the embodiment of the present invention is, for example, a computer program that can be provided by a recording medium or a communication medium provided in a computer-readable format to an information processing apparatus or a computer system that can execute various program codes. By providing such a computer program in the computer-readable format, processing corresponding to the computer program is realized on the information processing apparatus or the computer system.

Further objects, characteristics, and advantages of the present invention will be made clear by more detailed explanation based on embodiments of the present invention explained below and the accompanying drawings. In this specification, a system is a logical set configuration of plural apparatuses and is not limited to a system in which apparatuses having respective configurations are present in the same housing.

According to the configurations of the embodiments of the present invention, in an information processing apparatus that performs processing of copying recorded data of an information recording medium to another medium or the like, when data recorded on a recording medium at a copy source is encrypted unit data individually encrypted by a unit key corresponding to a unit, copy processing information (dealManifest) in which title information usable as index information of the unit is acquired from the information recording medium or a management server. The information processing apparatus reads the title information in the copy processing information (dealManifest) acquired from the management server, selects a unit key corresponding to the title information, and executes decryption processing in unit of the unit by the selected unit key to generate data for copy. With this configuration, it is possible to smoothly perform identification of a unit and acquisition processing of a unit key. Therefore, quick copy processing is realized.

BRIEF DESCRIPTION OF THE DRAWINGS

FIG. 1 is a diagram for explaining a unit configuration and a unit key management table;

FIG. 5 is a diagram for explaining the structure of copy processing information (dealManifest) according to an embodiment of the present invention;

FIG. 9 is a diagram for explaining the structure of the copy processing information (dealManifest) according to the embodiment of the present invention;

DESCRIPTION OF THE PREFERRED EMBODIMENTS

Figure 2:
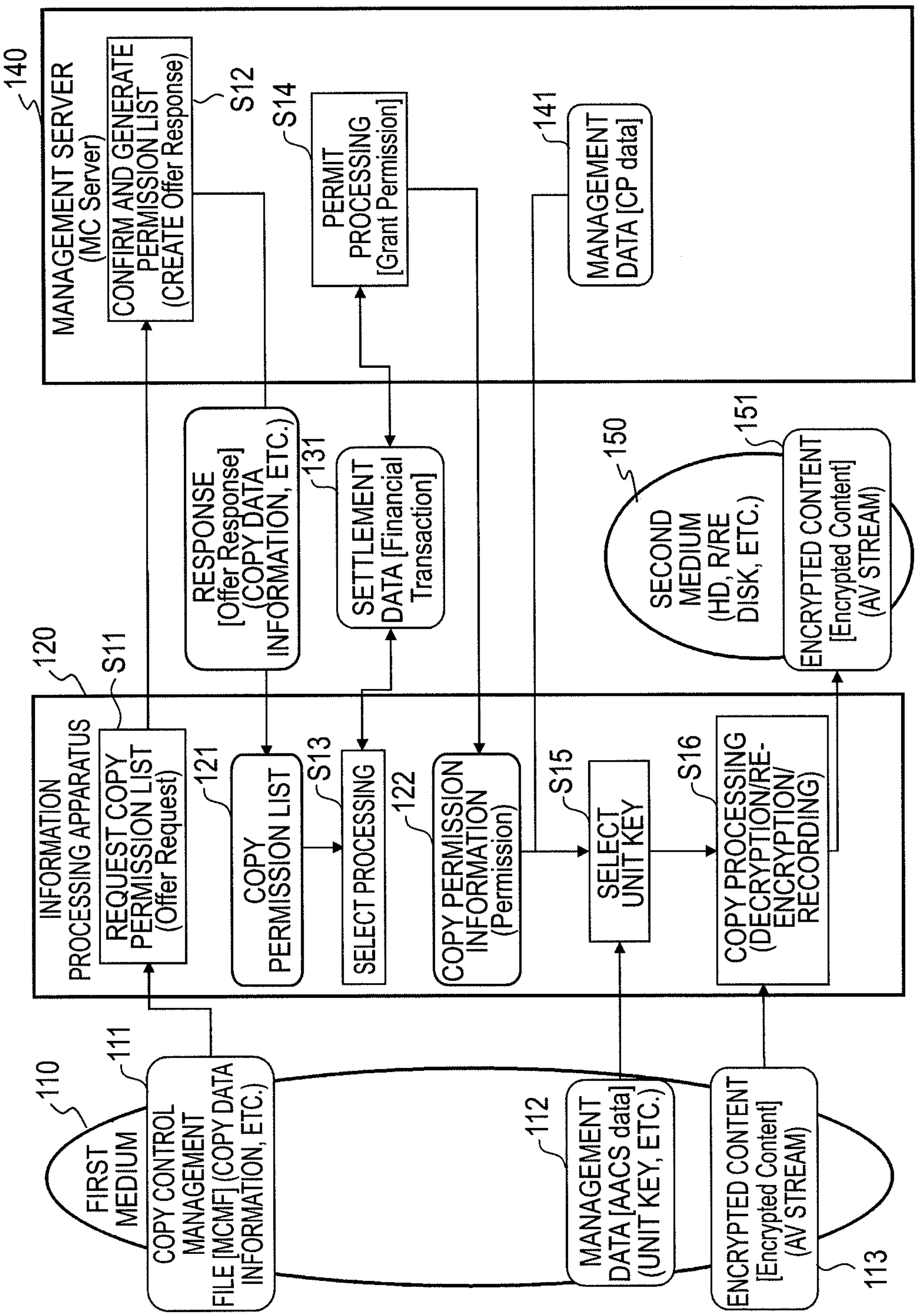
FIG. 2 is a diagram for explaining a sequence of copy processing (MC (Managed Copy)) according to management by a management server.

Details of an information processing apparatus, an information processing system, an information processing method, and a computer program according to embodiments of the present invention are explained below with reference to the accompanying drawings. The explanation is made according to items described below.

1. Overviews of an encryption configuration for content and managed copy (MC)

2. A basic structure information of the present copy processing information (dealManifest)

3. The structure of copy processing information (dealManifest) proposed in the present invention 4. Measures for reproduction path designated content 5. Measures for reproduction content to be reproduced by using a content code 6. An embodiment for discriminating a data type of a copy source and executing copy processing 7. A configuration example of an information processing apparatus

[1. Overviews of an Encryption Configuration for Content and Managed Copy (MC)]

First, overviews of an encryption configuration for recorded content of an information recording medium and managed copy (MC) are explained.

Most of contents such as a movie recorded on a general content recorded disk such as a BD (Blu-ray Disc (registered trademark)) are recorded while being encrypted in order to prevent illegal use such as illegal copy.

Encrypted content conforming to an AACS (Advanced Access Content System) standard as a standard concerning a copyright protection technique for content is sectioned into units as explained above and recorded as encrypted data to which an encryption key different for each of units is applied. Since an encryption configuration in unit of the unit is adopted, it is possible to perform use control in unit of the unit and various kinds of strict content use control are realized.

A unit as a segmentation unit of content is called content management unit or CPS unit. An encryption key corresponding to each CPS unit is called CPS unit key, unit key, or title key. An example of a correspondence relation between unit segments of contents recorded on a disk and encryption keys (unit keys) is shown in FIG. 1.

FIG. 1 is an example of a unit management table indicating a correspondence relation between units (CPS units) forming content recorded on a certain medium, for example, one disk and CPS unit keys as encryption keys. This unit key management table is recorded on a medium (a BD, etc.) together with encrypted content.

As shown in FIG. 1, CPS units as structure data of content are sectioned into CPS units 1 to n. CPS unit keys as peculiar encryption keys are associated with the respective CPS units 1 to n.

For example, when the CPS unit 1 (CPS1) is reproduced, decryption is performed by using a CPS unit key 1 (Ku1). When the CPS unit 2 (CPS2) is reproduced, it is necessary to perform decryption by applying a CPS unit key 2 (Ku2). As an index corresponding to each of the CPS units and the CPS unit keys, for example, "title" is used. The "title" is an index set to correspond to each of the CPS units. It is possible to specify a CPS unit and a CPS unit key by specifying a title.

As a copy control configuration for content recorded on an information recording medium, an overview of managed copy (MC) specified by the AACS is explained with reference to FIG. 2.

In FIG. 2, the following devices are shown from the left: a first medium 110 such as a ROM disk on which content such as a movie is recorded, an information processing apparatus 120 as a user apparatus that performs processing for reading data such as content from the first medium 110 and copying the data to a second medium 150 (a copy destination medium) such as a HD or an R or RE disk as a data-recordable medium, the second medium 150 as a medium at a copy destination of content including a HD or an R or RE disk, and a management server (MC server) 140 that executes processing for providing permission information for content copy processing and management data.

The information processing apparatus 120 includes, for example, a PC or a recording and reproducing apparatus and performs processing for inputting data read from the first medium 110 and recording the data on the second medium 150 as the copy destination medium including a HD or an R or RE disk.

The second medium 150 is a medium on which data can be written. Specifically, the second medium 150 is, for example, a hard disk (HD), an R or RE Blue-ray Disc (registered trademark), or a DVD disc.

As shown in the figure, encrypted content 113 as use control content is recorded on the first medium 110 including, for example, a ROM disk. The encrypted content 113 is, for example, an AV (Audio Visual) stream of moving image content such as a HD (High Definition) movie content as high-definition moving image data or content including music data, a game program, an image file, sound data, or text data. As explained with reference to FIG. 1, the encrypted content 113 is data encrypted by applying an individual unit key in unit of the unit that is sectioned data corresponding to an individual title.

Further, management data (AACS Data) 112 including key information applied to decryption of encrypted content or use control information and a copy control management file (MCMF: Managed Copy Manifest File) 111 used in copy processing of recorded content of the first medium 110 are stored on the first medium 110.

As explained with reference to FIG. 1, the encrypted content 113 is encrypted content that has a use management structure in unit of a content management unit (CPS unit) and to which encryption is applied by applying a unit key (a CPS unit key) different in unit of the CPS unit. In order words, in order to realize different use control for each segment data in unit of the unit, the encrypted content 113 is encrypted by a key (called CPS unit key, unit key, or title key) different for each unit.

The management data 112 indicated as recording information of the first medium 110 shown in FIG. 2 is, for example, management data specified by the AACS (Advanced Access Content System) that is a standard management system concerning a copyright protection technique for content. The management data 112 is data including a CPS unit key file in which keys (unit keys) applied to decryption of the encrypted content 113 are stored, use license information, a content certificate (CC) indicating propriety of content, and an encryption key block (MKB (Media Key Block)) in which media keys for acquiring CPS unit keys are stored.

The MKB (Media Key Block) is briefly explained. The MKB is an encryption key block generated on the basis of a key distribution system of a tree structure known as a form of a broadcast encryption system. The MKB is key information block that makes it possible to acquire a media key [Km], which is a key necessary for decryption of content, according to only processing (decryption) based on a device key [Kd] stored in an information processing apparatus of a user who has a valid license. An information distribution system conforming to a so-called hierarchical tree structure is applied to the MKB. The MKB enables acquisition of the media key [Km] only when a user device (an information processing apparatus) has a valid license and disables acquisition of the media key [Km] in an invalidated (revoked) user device. The device key [Kd] is stored in a memory of the information processing apparatus 120 shown in FIG. 2.

The copy control management file (MCMF: Managed Copy Manifest File) 111 shown as recording information of the first medium 110 shown in FIG. 2 is a file applied when copy processing of the content 113 recorded on the first medium 110 is executed. For example, the copy control management file 111 is XML description data including the following information:

(a) Content ID: An identifier (ID) uniquely indicating recorded content of the first medium 110, for example, an ISAN number as content code information is used; and (b) URI (URL): Information for connection to a management server that executes, for example, permission of copy in execution of content copy and generation of a token by bind processing. Information concerning access to the management server 140 in the configuration shown in FIG. 2.

(c) Copy processing information (dealManifest): information concerning data for allowing copy processing. For example, information concerning a file name of a file to be a copy target is included.

A processing sequence in copying, for example, the encrypted content 113 recorded on the first medium 110 as a ROM disk to another medium such as the second medium 150 including a hard disk or an R or RE disk is explained with reference to FIG. 2.

First, in step S11, the information processing apparatus 120 transmits a copy permission list request (Offer Request) to the management server 140 by applying server information (a URI, etc.) recorded in the copy control management file (MCMF) 111 recorded on the first medium 110.

In transmitting the copy permission list request, the information processing apparatus 120 transmits a content ID or the like corresponding to content as a copy processing target to the management server 140.

In step S12, the management server 140 executes processing for verifying propriety or the like of received information such as the content ID received from the information processing apparatus 120. When it is confirmed that there is no problem, the management server 140 generates a copy permission list (Offer List) 121 and transmits the copy permission list 121 to the information processing apparatus 120. The copy permission list 121 is a list including information such as a list of files permitted to be copied.

The copy permission list (Offer List) 121 provided by the management server 140 includes data same as the copy processing information (dealManifest) in (c) above recorded in the copy control management file (MCMF) 111 recorded on the first medium 110.

The information processing apparatus 120 displays the copy permission list (Offer List) 121 received from the management server 140 on a display. In step S13, when a user executes processing selection for designating content or the like as a copy target, the information processing apparatus 120 executes settlement processing involved in copy processing between the information processing apparatus 120 and the management server 140. Specifically, for example, transfer processing of settlement data 131 is performed between the information processing apparatus 120 and the management server 140. When the management server 140 permits copy processing in step S14, the management server 140 transmits copy permission information 122 to the information processing apparatus 120.

The information processing apparatus 120 shifts to content copy processing on condition that the copy permission information 122 from the management server 140 is received. First, in step S15, the information processing apparatus 120 acquires the management data 112 from the first medium 110, acquires the unit keys included in the management data 112, and selects a unit key corresponding to data as a copy target.

Subsequently, in step S16, the information processing apparatus 120 reads out the encrypted content 113 from the first medium 110, selects the data as the copy target, performs decryption processing, and executes data copy on the second medium 150 including a HD or an R or RE disk as a copy target.

The copy processing in step S16 includes the following processing:

(1) readout of encrypted content from the first medium 110 (a copy source medium);

(2) decryption processing of the encrypted content conforming to a first management system corresponding to the first medium 110 (the copy source medium);

(3) encryption processing of content conforming to a second management system corresponding to the second medium 150 (a copy destination medium); and (4) recording processing of the encrypted content on the second medium 150 (the copy destination medium).

It is necessary to perform processing according to such a sequence.

The decryption processing of the encrypted content conforming to the first management system in (2) above is performed as decryption processing in unit of the CPS units to which the CPS unit keys are applied when the first management system is a system conforming to the AACS standard.

The second management system corresponding to the copy destination medium (the second medium 150) is a management system corresponding to the AACS or various standards adapted to media such as CPRM, MagicGate, and VCPS.

[2. A Basic Configuration Example of the Copy Processing Information (dealManifest)]

In the copy management configuration in which copy is permitted on condition that copy permission information from the server is received, the information processing apparatus 120 can specify copy target data using the copy processing information (dealManifest) included in the copy permission list 121 received from the management server 140. For example, the information processing apparatus 120 can specify a copy target in unit of the unit.

However, as explained above, when the encrypted content 113 stored in the disk 110 is subjected to encryption processing in unit of the unit, one file is not always one unit. Therefore, even if a file is specified, it is difficult to specify a unit and a unit key. When copy processing is performed, the information processing apparatus 120 needs to specify a unit forming copy target data, acquire a unit key corresponding to the unit, and perform decryption processing in unit of the unit.

If the information processing apparatus 120 can obtain information for specifying a unit to be a copy target, the information processing apparatus 120 can acquire a unit key using the unit specifying information. However, in the present situation, effective means for obtaining such information is not present. Concerning content encrypted in unit of the unit, it is difficult to quickly perform copying under a content managing system that permits copying on condition that copy permission information is received.

The AACS for performing management of content copyright proposes to, in execution of managed copy (MC) that specifies content copy processing under server management, provide copy processing information (dealManifest) from the management server to a user apparatus and cause the user apparatus to efficiently perform copy processing using the copy processing information (dealManifest).

Figure 3:
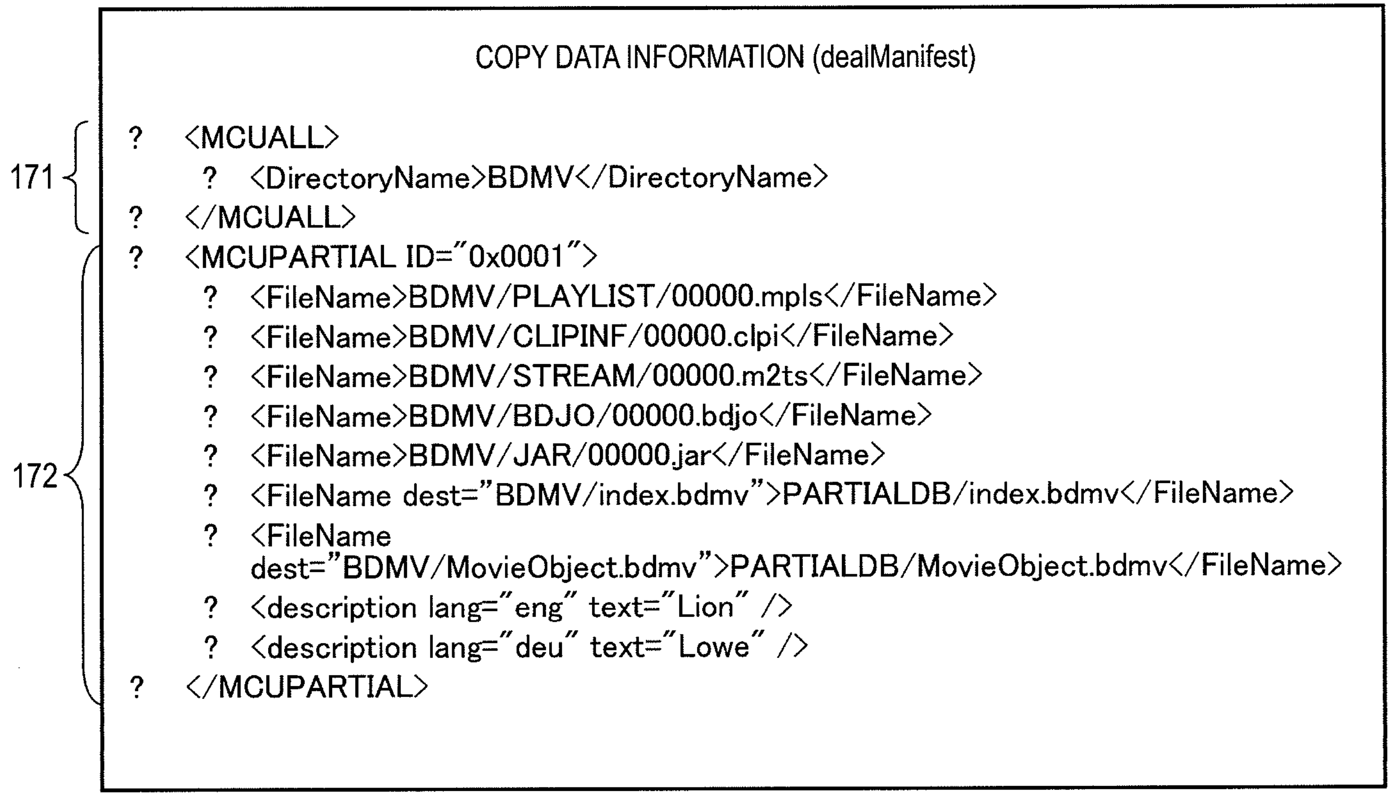
FIG. 3 is a diagram for explaining a basic configuration of copy processing information (dealManifest)

A basic structure example of the copy processing information (dealManifest) proposed by the AACS is shown in FIG. 3.

The copy processing information (dealManifest) is included in the copy permission list 121 provided to the information processing apparatus 120 by the management server 140 shown in FIG. 2.

The copy processing information (dealManifest) is data also included in the copy control management file (MCMF) 111 stored in the first medium 110.

As shown in FIG. 3, the copy processing information (dealManifest) is XML description data including the following two kinds of information:

(a) first information 171 [MCUALL] for executing copy processing with files in an entire directory set as copy targets; and (b) second information 172 [MCUPARTIAL] for executing copy processing with an individual file in the directory set as a copy target.

The information processing apparatus 120 presents, on the basis of the XML description data shown in FIG. 3, information concerning copy target content on the display. The user can select the copy target content on the basis of the presented information.

The first information 171 [MCUALL] is information used for collectively copying all files under a directory (a BDMV directory) corresponding to content recorded on a BD. A directory name [BDMV] is recorded.

This information is information set such that the information processing apparatus 120 that performs copy processing can select a directory corresponding to the directory name [BDMV] from various data recorded on the first medium 110 and perform collective copying of data under the directory.

The second information 172 [MCUPARTIAL] is information for selecting an individual file set under the directory [BDMV] and executing copying. Information concerning file names set under the directory [BDMV] is recorded.

Figure 4:
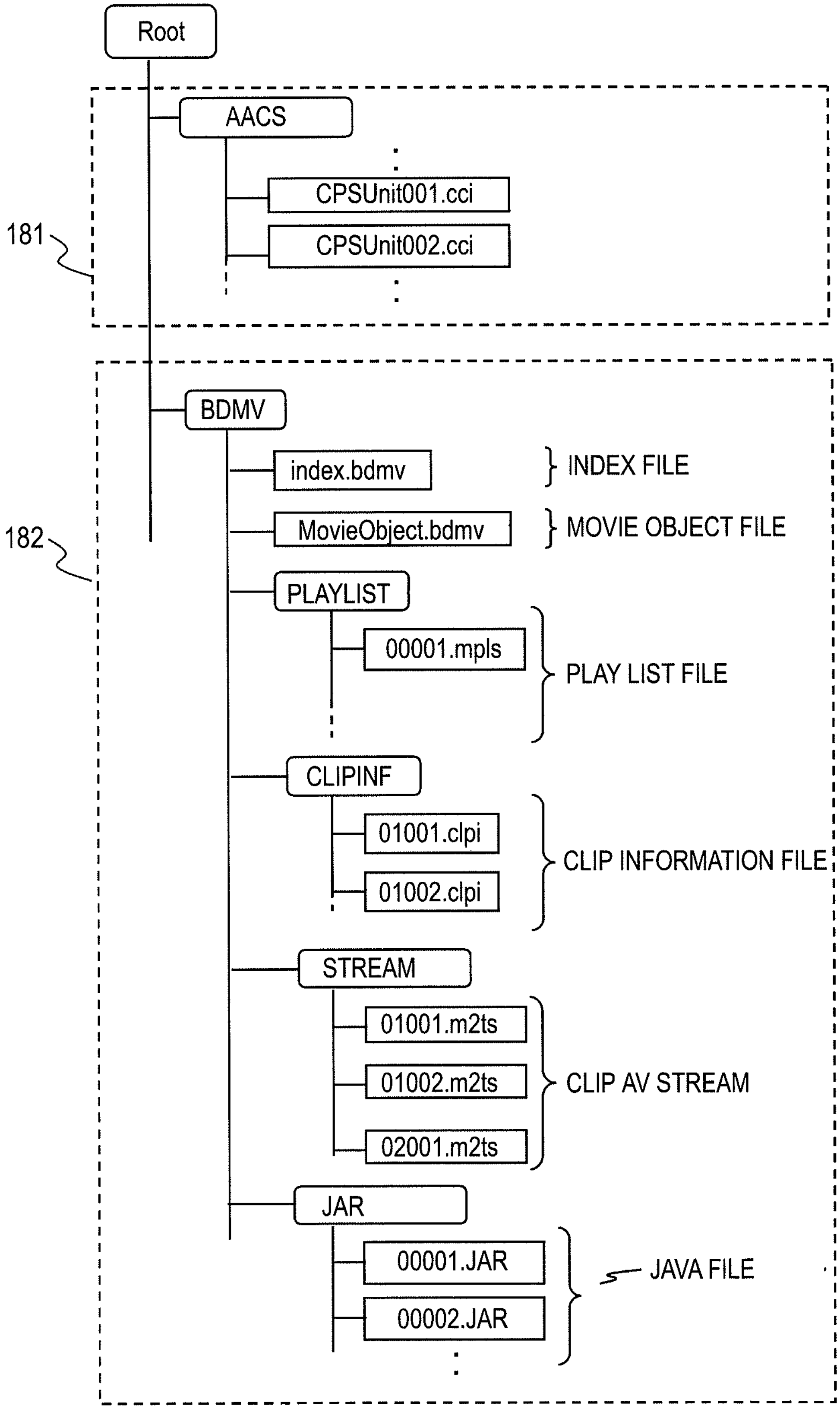
FIG. 4 is a diagram for explaining a directory structure example of a medium.

For example, the directory corresponding to the recorded data of the BD has the structure shown in FIG. 4. The directory is separated into a management information setting unit 181 (an AACS directory) and a data section 182 (a BDMV directory) as shown in FIG. 4.

A CPS unit key file, a use control information file, and the like are stored in the management information setting unit 181 (the AACS directory).

On the other hand, in the data section 182, for example, an index file, a play list file, a clip information file, a clip AV stream file, and a JAR file are recorded under the BDMV directory.

In the index file, title information as index information applied to reproduction processing is stored. This title is the same as the title registered in the unit key management table explained with reference to FIG. 1 above and is data associated with the CPS units.

The play list file is a file that specifies, for example, reproduction order of contents conforming to program information of a reproduction program designated by the title and has master-disciple information with respect to the clip information having reproduction position information.

The clip information file is a file designated by a play list file and has, for example, reproduction position information of the clip AV stream file.

The clip AV stream file is a file in which AV stream data to be a reproduction target is stored.

The JAR file is a file in which a JAVA (registered trademark) program, a command, and the like are stored.

A sequence for the information processing apparatus 120 to reproduce content recorded on the information recording medium is as explained below.

First, the information processing apparatus 120 designates, with a reproduction application, a specific title from the index file.

The information processing apparatus 120 selects a reproduction program associated with the designated title.

The information processing apparatus 120 selects, according to program information of the selected reproduction program, a play list that specifies, for example, reproduction order of contents.

The information processing apparatus 120 reads out, according to clip information specified in the selected play list, an AV stream or a command as content actual data and performs reproduction of the AV stream and execution processing of the command.

In this content reproduction processing, it is possible to discriminate, according to the selected title, a unit and a unit key as explained with reference to FIG. 1 above. The information processing apparatus 120 acquires a unit key corresponding to a unit as a reproduction target and performs decryption processing in unit of the unit.

However, when the copy processing explained with reference to FIG. 2 is executed, the information processing apparatus 120 specifies copy target data with reference to the copy processing information (dealManifest) shown in FIG. 3 received from the server. In the copy processing information (dealManifest) shown in FIG. 3, a file name is recorded but information for discriminating a CPS unit is not included. Therefore, the information processing apparatus 120 may be unable to discriminate a unit of the copy target data even if the information processing apparatus 120 refers to the copy processing information (dealManifest) shown in FIG. 3.

[3. The Configuration of the Copy Processing Information (dealManifest) Proposed in the Present Invention]

The configuration of the copy processing information (dealManifest) proposed in the present invention is explained.

FIG. 5 is a diagram of a configuration example of the copy processing information (dealManifest) proposed in the present invention.

The copy processing information (dealManifest) is set to include at least one of storage information of the copy permission list 121 provided from the management server 140 to the information processing apparatus 120 shown in FIG. 2 and storage information of the copy control management file (MCMF) 111 stored in the first medium 110. The copy processing information (dealManifest) can be used in the information processing apparatus 120 that performs copy processing.

Specifically, the copy processing information (dealManifest) is set as information that the information processing apparatus 120 can refer to in copying content of the first medium 110 to the second medium 150.

Like the data shown in FIG. 3 explained above, the copy processing information (dealManifest) shown in FIG. 5 is XML description data and includes the following two kinds of information:

(a) first information 201 [MCUALL] for executing copy processing with files in an entire directory set as copy targets; and (b) second information 202 [MCUPARTIAL] for executing copy processing with an individual file in the directory set as a copy target The copy processing information (dealManifest) proposed in the present invention includes all the kinds of information explained with reference to FIG. 3 and further includes title information 203 shown in FIG. 5.

The title information 203 is the identification information for a title set as index data corresponding to a unit explained with reference to FIG. 1 above. The title information may be ID information for identifying an individual tile or may be the title itself.

In other words, the title information 203 only has to be information from which the information processing apparatus that executes copy processing can acquire a title corresponding to a unit set as a copy target.

A sequence of copy processing performed by using the copy processing information (dealManifest) shown in FIG. 5 is, for example, as explained below.

The information processing apparatus 120 presents display information based on the XML description data shown in FIG. 5 on the display.

Since the copy processing information (dealManifest) shown in FIG. 5 includes the title information, the information displayed on the display is display information including the title. Consequently, the user can select copy target content designating the title included in the display information.

As explained above with reference to FIG. 1, the title is an index of a CPS unit and set in association with the CPS unit and a CPS unit key. Therefore, the information processing apparatus 120 can specify a CPS unit and a CPS unit key according to a designated title.

The information processing apparatus that executes copy processing can acquire, from the copy processing information (dealManifest) shown in FIG. 5, for example, title information designated by the user, specify, using the unit key management table shown in FIG. 1, a unit key corresponding to a copy target unit on the basis of the acquired title, and acquire the unit key.

The CPS unit key itself is stored in the CPS unit key file in the management data 112 shown in FIG. 2. In order to acquire a specific CPS unit key from the CPS unit key file, the information processing apparatus 120 uses unit key identifiers (Ku1 to Kun) recorded in the unit key management table shown in FIG. 1 and acquires the unit key corresponding to the title from the CPS unit key file on the basis of the unit key identifiers (Ku1 to Kun). The information processing apparatus 120 can perform decryption processing of the unit set as the copy target by applying the acquired CPS unit key and execute recording processing on a copy destination medium.

In copy processing corresponding to the copy destination, as explained above, after the decryption processing, processing such as re-encryption conforming to a management system corresponding to the copy destination medium is further performed.

In this way, the copy processing information (dealManifest) including the title information 103 shown in FIG. 5 is used. This makes it possible to acquire title information from the copy target unit from the copy processing information (dealManifest). As a result, the information processing apparatus 120 can acquire a unit key corresponding to the title, execute decryption processing in unit of the unit, and quickly perform copy processing.

A copy processing sequence performed by using the copy processing information (dealManifest) including the title information is explained with reference to a flowchart shown in FIG. 6.

Figure 6:
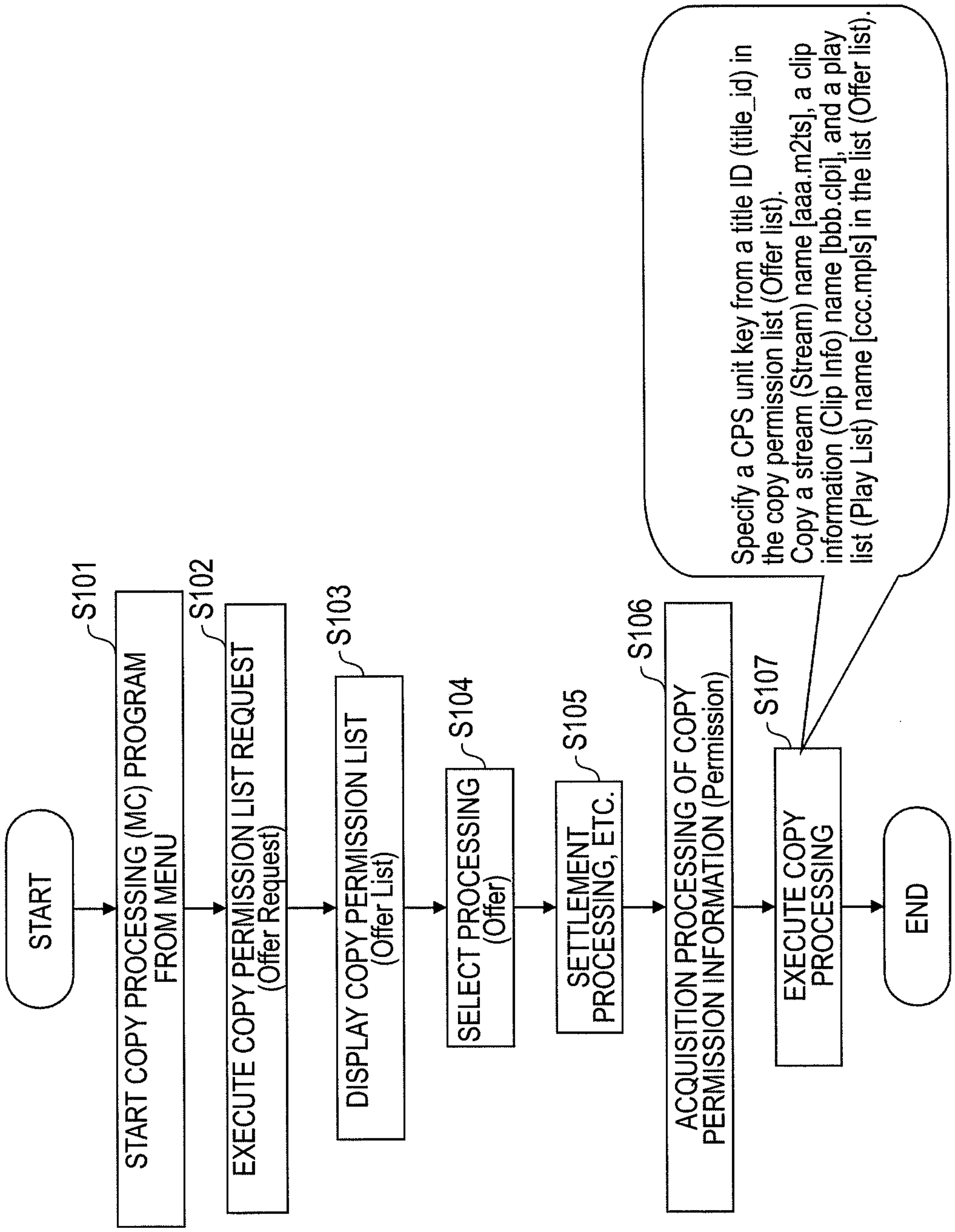
FIG. 6 is a flowchart for explaining a sequence of copy processing performed by using the copy processing information (dealManifest) according to the embodiment of the present invention.

A flow shown in FIG. 6 is executed in the information processing apparatus 120 shown in FIG. 2. For example, a control unit including a CPU of the information processing apparatus 120 executes a computer program (a copy processing (MC: Managed Copy) program) stored in advance in the memory in the information processing apparatus 120 and performs processing.

Processing in processing steps of the flowchart shown in FIG. 6 is explained below.

In step S101, the user selects a copy processing (MC) program from a menu displayed on a display unit of the information processing apparatus 120 and starts the copy processing (MC) program.

Subsequently, in step S102, the information processing apparatus 120 executes request processing (Offer Request) for a copy permission list. This processing corresponds to the processing in step S11 explained with reference to FIG. 2 and is performed as transmission processing of a copy permission list request (Offer Request) to the management server 140.

In step S103, the information processing apparatus 120 displays a copy permission list (Offer list) received from the management server 140 on the display unit of the information processing apparatus 120. This list is display information generated on the basis of the copy processing information (dealManifest) as the XML description data explained with reference to FIG. 5.

The information processing apparatus 120 may be configured to automatically execute the transmission processing of the copy permission list request (Offer Request) to the management server 140 when a disk is inserted rather than when the copy processing is executed. Specifically, the information processing apparatus 120 may be configured to, when insertion of a disk is detected, transmit the copy permission list request (Offer Request) to the management server 140, receive a copy permission list from the management server 140 in advance, and store the copy permission list in the memory in the information processing apparatus 120.

In this case, when the copy processing is executed, the copy permission list is already stored in the memory in the information processing apparatus 120. Therefore, the communication with the management server 140 is omitted in the processing in steps S102 to S103. The information processing apparatus 120 performs processing for reading out the copy permission list from the memory in the information processing apparatus 120 and displaying the copy permission list.

In step S104, the information processing apparatus 120 performs selection of processing (Offer). Specifically, the information processing apparatus 120 specifies copy target data. This processing is performed as, for example, input processing of selected information via an input unit by the user. The user can designate a title included in display information generated on the basis of the copy processing information (dealManifest) explained with reference to FIG. 5.

When the copy target data is determined, the information processing apparatus 120 transmits information concerning the copy target data to the management server 140. In step S105, the information processing apparatus 120 executes settlement processing conforming to a sequence specified in advance. This processing is equivalent to the processing to which the settlement data 131 is applied shown in FIG. 2.

When the settlement processing in step S105 is completed, the information processing apparatus 120 proceeds to step S106 and receives copy permission information (Permission) from the management server 140. This processing is the reception processing of the copy permission information 122 shown in FIG. 2.

In step S107, the information processing apparatus 120 executes copy processing. In this copy processing, decryption processing in unit of the unit is executed as explained below.

The information processing apparatus 120 selects, on the basis of designated title information (title_id), a CPS unit key from the copy processing information (dealManifest) shown in FIG. 5 included in the copy permission list (Offer list).

The selected CPS unit key is a key applied to encryption processing and decryption processing corresponding to a CPS unit as copy target data. The decryption processing in unit of the unit is executed by using this unit key.

Unit identification is executed according to a title. For example, a file belonging to the unit is acquired from the first medium 110 with reference to file names included in the copy processing information (dealManifest) shown in FIG. 5, i.e., a stream (Stream) name [aaa.m2ts], a clip information (Clip Info) name [bbb.clpi], and a play list (Play list) name [ccc.mpls] and the copy processing is executed.

In the copy processing in step S107, as explained above, processing is executed according to the following sequence:

(1) readout of encrypted content from the first medium 110 (the copy source medium);

(2) decryption processing of the encrypted content conforming to the first management system corresponding to the first medium 110 (the copy source medium);

(3) encryption processing of the content conforming to the second management system corresponding to the second medium 150 (the copy destination medium); and (4) recording processing for recording the encrypted content on the second medium 150 (the copy destination medium).

The configuration for using the copy processing information (dealManifest) including the title information 103 as shown in FIG. 5 is adopted. Therefore, the information processing apparatus 120 can acquire title information corresponding to a copy target unit from the copy processing information (dealManifest). As a result, the information processing apparatus 120 can acquire a unit key corresponding to the title, execute decryption processing in unit of the unit, and quickly perform copy processing.

[4. Measures for Reproduction Path Designated Content]

Measures for realizing smooth copy processing when content set as a copy target, i.e., the encrypted content 113 recorded on the first medium 110 including a ROM disk or the like shown in FIG. 2 is reproduction path designated content is explained.

The reproduction path designated content is explained with reference to FIG. 7. In principle, content is encrypted by a CPS unit key in unit of the unit as explained above. As shown in (a) of FIG. 7, content explained below is sectioned into a segment section and a non-segment section. The non-segment section is encrypted data by the CPS unit key. The segment section includes plural different variations. The segment section is encrypted by a different segment key for each of the variations. Variation data is, for example, data that is recognized as the same content in human visual sense and auditory sense but in which different audio watermarks or video watermarks are embedded or data in which, for example, video data or audio data slightly different from each other are embedded between variation data of the same segment to make it possible to specify, when a copy of content flows out, which variation data in segments of the content is reproduced.

In content reproduction, content reproduction conforming to a specific data path (data sequence) set by selecting specific segment data from plural segment sections is performed. In the non-segment section, decryption processing by a CPS unit key is executed and, in the segment section, decryption processing is executed by a segment key (Kseg), which can be acquired from a segment key file, to perform content reproduction. The segment key file is a file in which data obtained by encrypting segment keys corresponding to variation data in the plural segment sections (encrypted segment keys) are collectively recorded for each of classification numbers. The classification number is a number corresponding to a reproducing apparatus for selecting a play list acquired by processing a sequence key block with a sequence key as a key peculiar to the reproducing apparatus. The encrypted segment keys are recorded for each of the classification numbers as explained above in the segment key file and are recorded while being sectioned for each of play items in the file. Therefore, if a classification number and a play item number corresponding to the classification number are known, a segment key corresponding to the variation data is specified.

The information processing apparatus that executes content reproduction processing needs to acquire a CPS unit key corresponding to the non-segment section and a segment key (Kseg) corresponding to the segment section. An application configuration of a segment key and a sequence key is explained with reference to FIG. 7.

Figure 7:
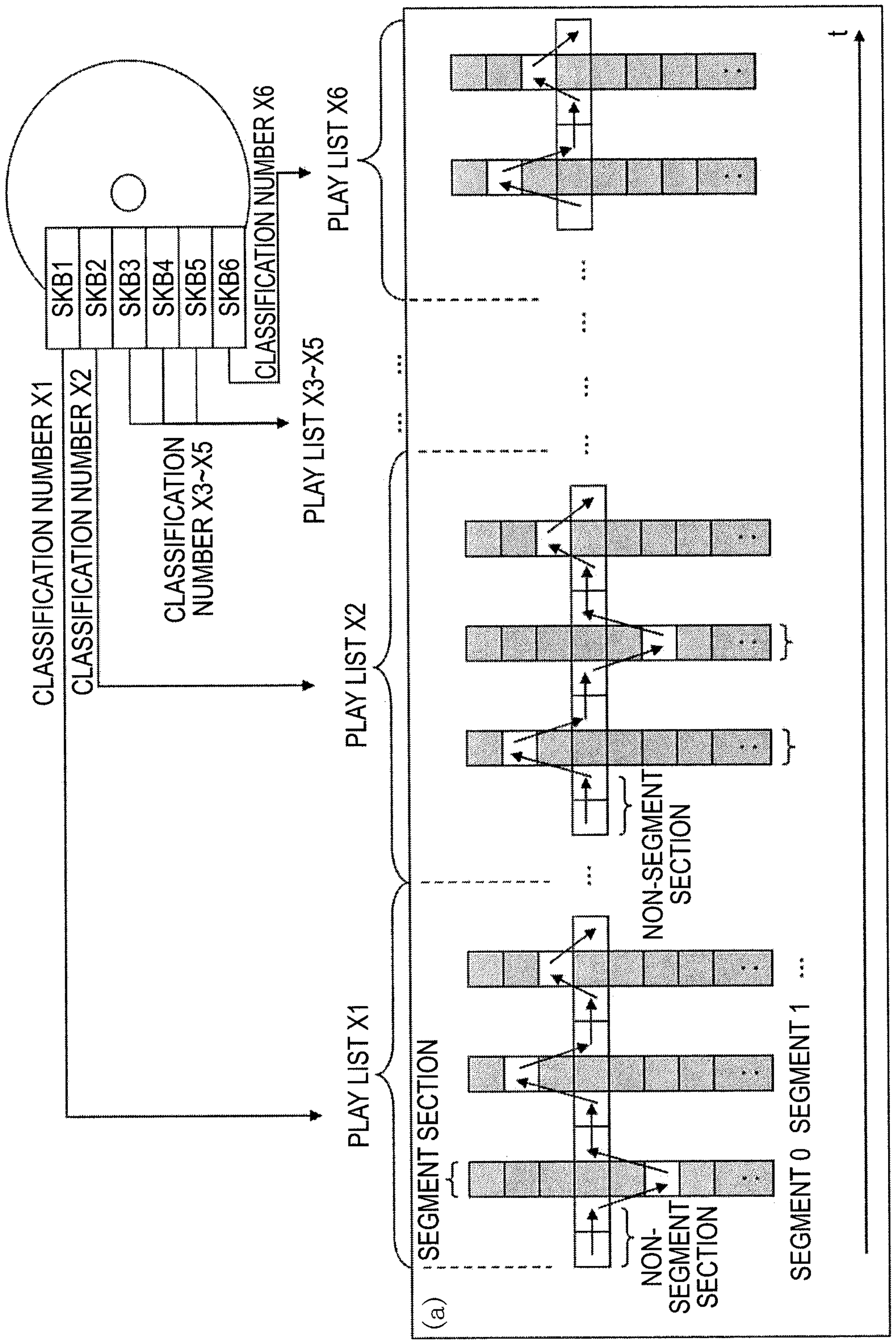
FIG. 7 is a diagram for explaining reproduction processing of reproduction path designated content to which a sequence key or a segment key is applied.

In (a) of FIG. 7, the structure of content stored in a medium (an information recording medium) is shown. The content is reproduced along time axis t shown from the left to the right. The content is roughly divided into n reproduction sections corresponding to n play lists X1 to Xn respectively selected according to classification numbers X1 to Xn respectively calculated from plural (n) sequence key blocks (SKBs) stored in the medium (the information recording medium).

In an example shown in FIG. 7, the number of reproduction sections n is 6. The content is roughly divided in to six reproduction sections corresponding to six play lists X1 to X6 respectively selected according to classification numbers X1 to X6 respectively calculated from six sequence key blocks (SKBs). Identification information X1 to X6 of the classification numbers and identification information X1 to X6 of the play lists are shown as the same identifiers X1 to X6. However, this is an example for facilitating understanding. The identification information X1 to X6 of the classification numbers and the identification information X1 to X6 of the play lists only have to be associated with each other. Different kinds of identification information may be used for the classification numbers and the play lists.

The play lists are setting information for a play item sequence stream for determining a reproduction path. For example, the play list X1 shown in the figure is a play list having information for designating, as reproduction content, a reproduction path conforming to arrows shown in a content section corresponding to the play list X1 shown in the figure. Concerning the play lists X2 to X6, reproduction paths in respective corresponding content sections are also specified. The information processing apparatus that executes content reproduction calculates the classification numbers X1 to Xn from the plural (n) sequence key blocks (SKBs) stored in the information recording medium, selects the n play lists X1 to Xn respectively selected according to the calculated classification numbers, sequentially applies the plural play lists X1 to Xn, and executes content reproduction.

For example, first, the information processing apparatus that executes content reproduction, to which the play list X1 is applied, selects a reproduction path determined according to the play list X1, i.e., content structure data (a play item) conforming to the arrows shown in the figure, and performs reproduction. The content is sectioned into the segment section and the non-segment section as shown in the figure. The non-segment section is encrypted by a CPS unit key. The segment section includes plural variations. The segment section includes segment data respectively encrypted by different segment keys.

In content reproduction, in the non-segment section, decryption processing by the CPS unit key is executed. In the segment section, specific segment data specified by the play list is selected and decryption processing is executed by a segment key acquired from the segment key file recorded on the information recording medium to perform content reproduction.

Concerning the play lists X2 to X6, reproduction processing conforming to reproduction paths specified by the play lists is executed in the same manner.

The segment key file in which the segment keys are stored is stored in the medium together with contents. For example, the segment key file is stored in the management data 112 in the first medium 110 shown in FIG. 2.

The sequence key block (SKB) necessary in calculating the classification numbers X1 to Xn for selecting the play lists X1 to Xn for specifying reproduction paths is also stored in the management data 112.

An acquisition processing procedure for a segment key performed in reproduction processing of reproduction content performed by using such a sequence key and a segment key is explained with reference to FIG. 8.

Figure 8:
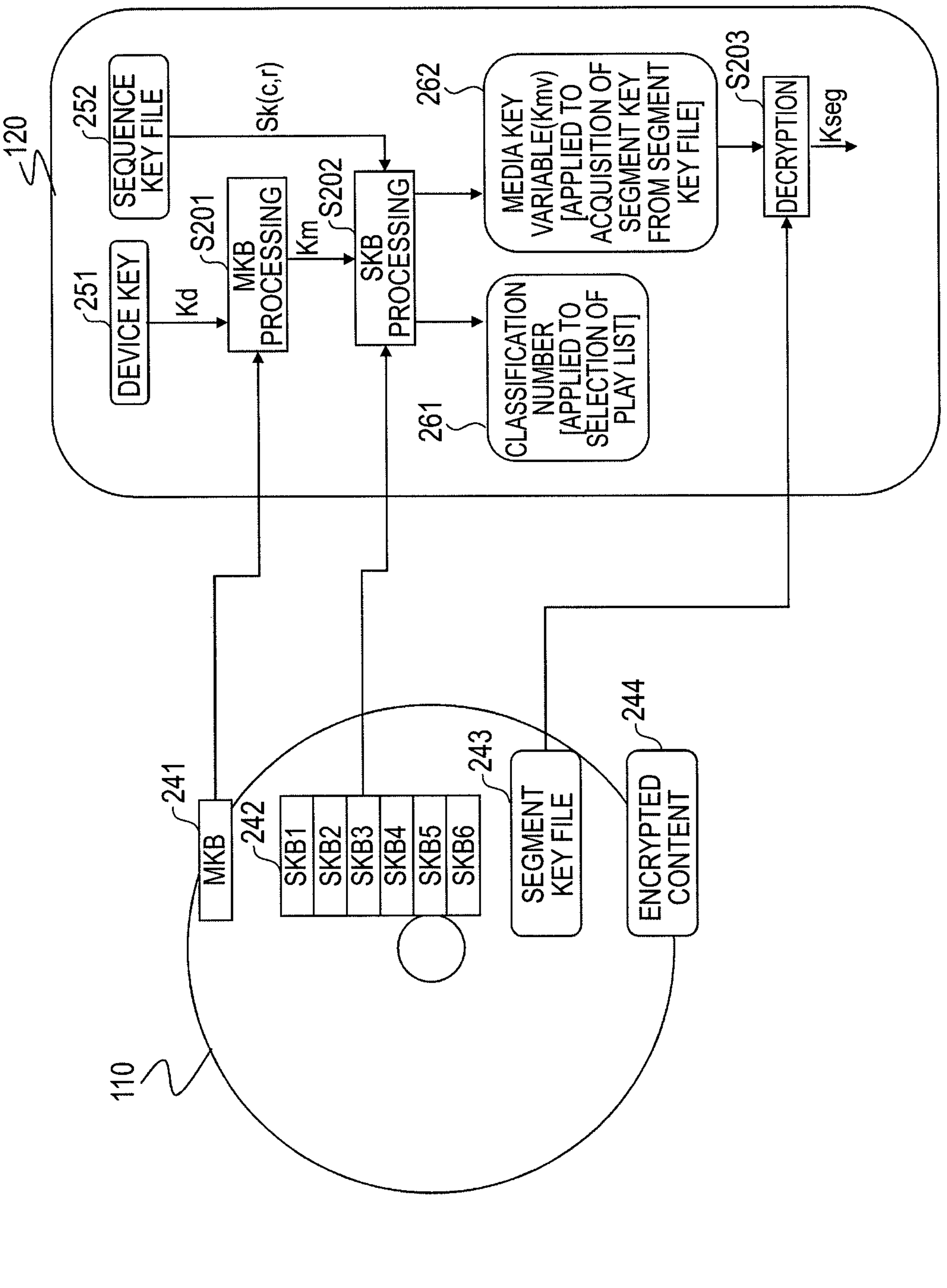
FIG. 8 is a diagram for explaining the reproduction processing of the reproduction path designated content to which the sequence key or the segment key is applied.

In FIG. 8, the first medium 110 that stores encrypted content 244 that can be reproduced by using a sequence key and a segment key and the information processing apparatus 120 that performs the reproduction processing are shown.

In the first medium 110, an MKB (Media Key Block) 241 as an encryption key block, a sequence key block (SKB) 242, and a segment key file 243 are stored. Data of the MKB (Media Key Block) 241, the sequence key block (SKB) 242, and the segment key file 243 is included in the management data 112 in the configuration shown in FIG. 2. The data of the copy control management file 111 and the like explained with reference to FIG. 2 above is stored in the first medium 110. However, the data is not shown in FIG. 8.

The MKB (Media Key Block) 241 as the encryption key block is, as explained above, an MKB (Media Key Block) as an encryption key block generated on the basis of the key distribution system of the tree structure known as a form of the broadcast encryption system. A media key (Kd) can be extracted by processing to which a device key 251 stored in the memory of the information processing apparatus 120 is applied. As explained above, the information processing apparatus 120 can acquire the media key (Km) only when the information processing apparatus 120 has a valid license. An invalidated (revoked) information processing may be unable to acquire the media key (Km).

Sequence key blocks (SKB1 to SKBn) included in the sequence key block (SKB) 242 store, for example, classification numbers (Variant No.) for selecting play lists that specify reproduction paths and information (a media key variable (Kmv)) applied to decryption and acquisition of segment keys encrypted and stored in the segment key file. The information processing apparatus that executes content reproduction processing acquires these kinds of information from the SKBs.

A processing sequence of the information processing apparatus 120 shown in FIG. 8 is explained. First, in step S201, the information processing apparatus 120 executes MKB processing and acquires the media key (Km) by applying the device key (Kd) 251 stored in the memory of the information processing apparatus 120. As long as the information processing apparatus 120 is not a revoked apparatus (invalidated as an illegal apparatus), the information processing apparatus 120 succeeds in the MKB processing and can acquire the media key (Km). When the information processing apparatus 120 is a revoked apparatus, the information processing apparatus 120 fails in the MKB processing and may be unable to acquire the media key (Km). In this case, the information processing apparatus 120 may be unable to execute processing after the MKB processing. As a result, content reproduction may be impossible.

When the information processing apparatus 120 is not a revoked apparatus and succeeds in the MKB processing and acquires the media key (Km), subsequently, in step S202, the information processing apparatus 120 executes processing of SKBs by applying the acquired media key (Km) and a sequence key acquired from a sequence key file stored in the information processing apparatus 120. The information processing apparatus 120 can acquire a classification number 261 and a media key variable (Kmy) 262 according to the processing of SKBs to which the media key (Km) and the sequence key are applied.

The classification number 261 is used as selection information for a play list as explained above. The classification number 261 can be used as information for further acquiring a segment key corresponding thereto from the segment key file. The media key variable (Kmv) 262 is used as information applied to segment key acquisition from the segment key file in which a segment key applied to decryption of structure data of a segment included in a reproduction path specified by the selected play list is stored.

In step S103, the information processing apparatus 120 acquires the segment key file stored in the first medium 110 and acquires the segment key (Kseg) according to decryption processing performed by using the media key variable (Kmv) 262.

It is possible to perform, using this segment key (Kseg), data reproduction conforming to a data path selected by a play list corresponding to a classification number explained with reference to FIG. 7 above. A CPS unit key is separately acquired from the CPS unit key file.

In this way, the information processing apparatus 120 acquires a classification number using a sequence key stored in the memory according to processing of a sequence key block reproduced from the medium 110, acquires identification information of a play list using the classification number, and acquires a segment key corresponding to a specific variation in the segment from the segment key file including an encryption key obtained by encrypting a key for decrypting data corresponding to a reproduction path.

The content reproduction processing to which a sequence key and a segment key are applied is described in detail in JP-A-2008-84445 filed earlier by the applicant.

When the reproduction path designated content, which needs to be reproduced and to which a sequence key and a segment key are applied, is copied, it is difficult to discriminate a play list file corresponding to a reproduction path, which the information processing apparatus 120 can use, according to only the data recorded in the copy processing information (dealManifest) explained with reference to FIG. 3 above.

As explained with reference to FIGS. 7 and 8, when reproduction of the reproduction path designated content to which a sequence key and a segment key are applied is performed, a play list corresponding to a classification number selected according to a sequence key of the information processing apparatus 120 has to be acquired.

Specifically, a play list usable by each of information processing apparatuses is different and, in copy processing, it is necessary to select a usable play list associated with this information processing apparatus and decrypt content conforming to a reproduction path specified by the play list. In this decryption processing, decryption processing to which a unit key and a segment key are applied has to be performed.

However, in the copy processing information (dealManifest) shown in FIG. 3, the file names set under the BDMV directory are only listed. It is difficult to discriminate which play list is a play list usable by the information processing apparatus that has the copy processing information (dealManifest). There is no information for acquiring a unit key and a segment key corresponding to a reproduction path.

The reproduction path designated content that can be reproduced by applying a sequence key and a segment key is content reproduced along a specific reproduction path. Data along this reproduction path is specified by a play list determined on the basis of a classification number associated with the information processing apparatus. In other words, a clip information file and a clip AV stream having information corresponding to a data path are determined by a specific play list corresponding to a specific reproduction path permitted to correspond to the information processing apparatus.

In copy processing, if a play list usable by the information processing apparatus is correctly selected, it is possible to acquire a clip information file and a clip AV stream as copy target data corresponding to a reproduction path by applying the selected play list. Therefore, what is necessary in the copy processing is a play list file name. Therefore, the play list file name is necessary for the copy processing information (dealManifest) referred to during the copy processing. However, it is unnecessary to include a clip information file name and a clip AV stream name.

In view of this situation, the copy processing information (dealManifest) presented to the information processing apparatus (the user apparatus) in copy processing of content to which a sequence key and a segment key are applied is set to have a data structure shown in FIG. 9.

The copy processing information (dealManifest) shown in FIG. 9 is set to include one of storage information of the copy permission list 121 provided from the management server 140 to the information processing apparatus 120 shown in FIG. 2 and storage information of the copy control management file (MCMF) 111 stored in the first medium 110. The copy processing information (dealManifest) is usable by the information processing apparatus 120 that performs copy processing.

Specifically, the copy processing information (dealManifest) is set as information that the information processing apparatus 120 can refer to in copying content of the first medium 110 to the second medium 150.

Like the data shown in FIGS. 3 and 5 explained above, the copy processing information (dealManifest) shown in FIG. 9 is XML description data and includes the following two kinds of information:

(a) first information 301 [MCUALL] for executing copy processing with files in an entire directory set as copy targets; and (b) second information 302 [MCUPARTIAL] for executing copy processing with an individual file in the directory set as a copy target.

Like the data shown in FIG. 5, the copy processing information (dealManifest) proposed in this example includes title information 303.

The title information 303 is the identification information for a title set as index data corresponding to a unit explained with reference to FIG. 1 above. The title information may be information for identifying an individual tile or may be the title itself.

In other words, the title information 303 only has to be information from which the information processing apparatus that executes copy processing can acquire title data corresponding to a unit set as a copy target.

In the copy processing information (dealManifest) in this example, a clip information file name, a clip AV stream name, and the like are not recorded in the second information 302 [MCUPARTIAL].

In the second information 302 [MCUPARTIAL] of the copy processing information (dealManifest) shown in FIG. 9, a play list name, i.e., <FileName>BDMV/PLAYLIST/0000.mpls</FileName> is recorded. However, the file names such as the clip information (CLIPINF) and the clip AV stream (STREAM) shown in FIGS. 3 and 5 are not recorded.

This is because, as explained above, if a play list usable by the information processing apparatus is correctly selected in copy processing, it is possible to acquire a clip information file and a clip AV stream as copy target data corresponding to a reproduction path by applying the selected play list. On the basis of this reason, in the second information 302 [MCUPARTIAL] of the copy processing information (dealManifest) shown in FIG. 9, a play list file name is recorded but a clip information file name, a clip AV stream name, and the like are not recorded.

A sequence of copy processing of reproduction path designated content is explained below with reference to a flowchart shown in FIG. 10. In this copy processing, the copy processing information (dealManifest) shown in FIG. 9 is used.

Figure 10:
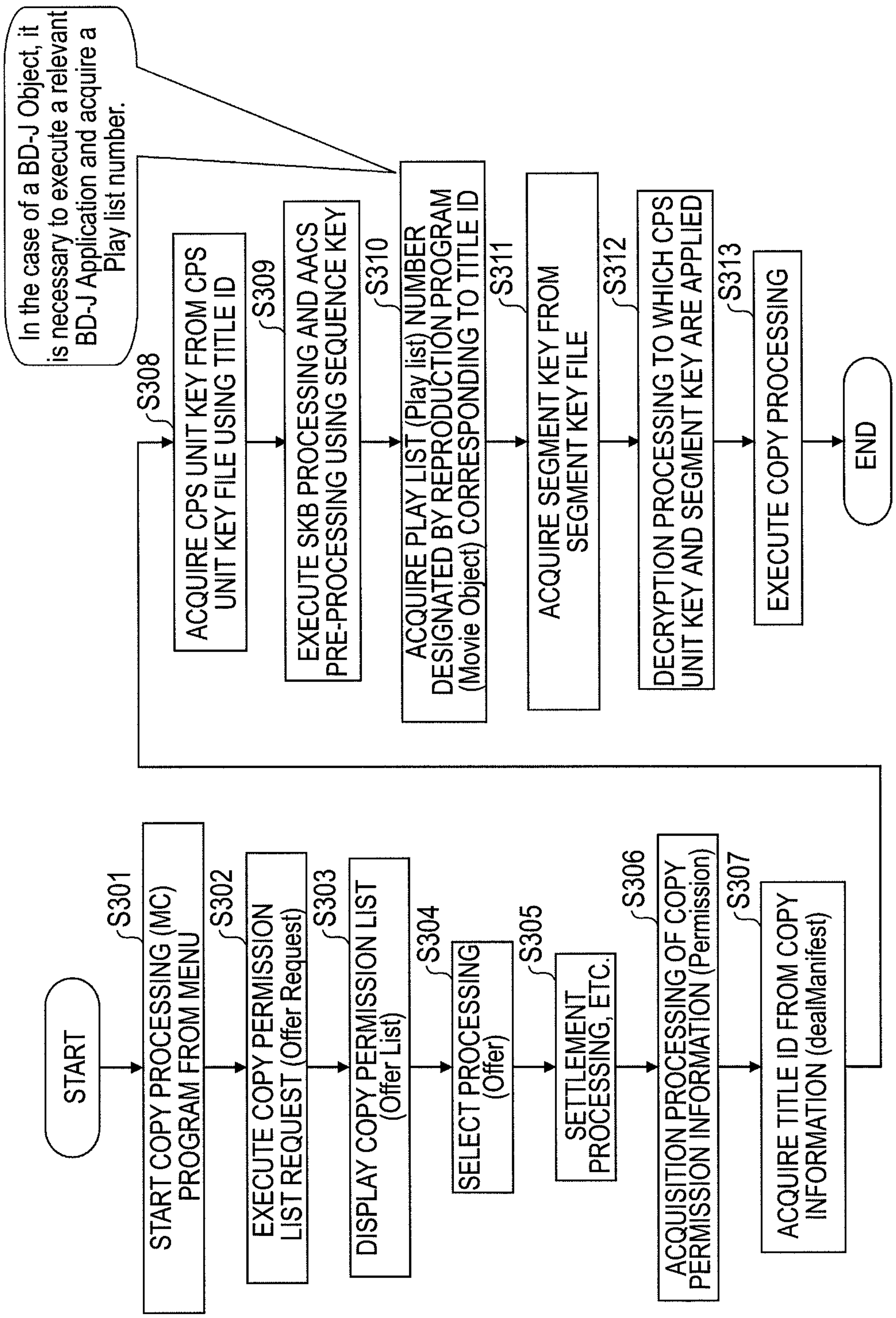
FIG. 10 is a flowchart for explaining a sequence of copy processing performed by using the copy processing information (dealManifest) according to the embodiment of the present invention.

A flow shown in FIG. 10 is executed in the information processing apparatus 120 shown in FIG. 2. For example, the control unit having the CPU of the information processing apparatus 120 executes a computer program (a copy processing (MC: Managed Copy) program) stored in advance in the memory in the information processing apparatus 120 and performs processing.

Processing in processing steps of the flowchart shown in FIG. 10 is explained.

In step S301, the user selects the copy processing (MC) program from the menu displayed on the display unit of the information processing apparatus 120 and starts the copy processing (MC) program.

Subsequently, in step S302, the information processing apparatus 120 executes a copy permission list request (Offer Request). This processing is equivalent to the processing in step S11 explained with reference to FIG. 2 and is performed as transmission processing of a copy permission list request (Offer Request) to the management server 140.

In step S303, the information processing apparatus 120 displays the copy permission list (Offer list) received from the management server 140 on the display unit of the information processing apparatus 120. This list is display information generated on the basis of the copy processing information (dealManifest) as the XML description data explained with reference to FIG. 9.

The information processing apparatus 120 may be configured to automatically execute the transmission processing of the copy permission list request (Offer Request) to the management server 140 when a disk is inserted rather than when the copy processing is executed. Specifically, when a disk is inserted, the information processing apparatus 120 receives a copy permission list in advance when the management server 140 and stores the copy permission list in the memory in the information processing apparatus 120.

In this case, when the copy processing is executed, the copy permission list is already stored in the memory in the information processing apparatus 120. Therefore, the communication with the management server 140 is omitted in the processing in steps S302 to S303. The information processing apparatus 120 performs processing for reading out the copy permission list from the memory in the information processing apparatus 120 and displaying the copy permission list.

In step S304, the information processing apparatus 120 performs selection of processing (Offer). Specifically, the information processing apparatus 120 specifies copy target data. This processing is performed as input processing of selected information via the input unit by the user. The user can designate, for example, a title included in display information generated on the basis of the copy processing information (dealManifest) explained with reference to FIG. 9.

When the copy target data is determined, the information processing apparatus 120 transmits information concerning the copy target data to the management server 140. In step S305, the information processing apparatus 120 executes settlement processing conforming to a sequence specified in advance. This processing is equivalent to the processing to which the settlement data 131 is applied shown in FIG. 2.

When the settlement processing in step S305 is completed, the information processing apparatus 120 proceeds to step S306 and receives copy permission information (Permission) from the management server 140. This processing is the reception processing of the copy permission information 122 shown in FIG. 2.

In step S307, the information processing apparatus 120 acquires title information selected from the copy processing information (dealManifest) by the user as a copy target.

In step S308, the information processing apparatus 120 acquires, on the basis of the selected title information, a CPS unit key associated with the title information. As explained above, the CPS unit key itself is stored in the CPS unit key file in the management data 112 shown in FIG. 2. In order to acquire a specific CPS unit key from the CPS unit key file, the information processing apparatus 120 uses the unit key identifiers (Ku1 to Kun) recorded in the unit key management table shown in FIG. 1 and acquires a unit key corresponding to a title from the CPS unit key file on the basis of the unit key identifiers (Ku1 to Kun).

In step S309, the information processing apparatus 120 executes the SKB processing explained with reference to FIG. 8 and AACS processing (the MKB processing in FIG. 8, etc.) by applying a sequence key stored in the memory in the information processing apparatus 120.

In step S310, the information processing apparatus 120 acquires a play list number designated by a reproduction program (Movie Object) corresponding to the title information selected as the copy target. This processing is equivalent to the acquisition processing of a classification number by the SKB processing explained with reference to FIG. 8. When copy target content is content started by a Java (registered trademark) application, the information processing apparatus 120 executes a BD-J application as a Java (registered trademark) and acquires a play list number.

In step S311, the information processing apparatus 120 acquires a segment key from the segment key file. This processing is equivalent to the acquisition processing of a segment key by the decryption processing of the segment key file 243 to which the media key variable acquired by the SKB processing is applied explained with reference to FIG. 8.

In step S312, the information processing apparatus 120 executes decryption processing of the copy target content using the CPS unit key and the segment key. This decryption target content is content corresponding to the title information acquired in step S307 and content corresponding to a reproduction path selected by a play list determined on the basis of the processing explained with reference to FIG. 8.

In step S313, the information processing apparatus 120 performs, using the decrypted content, recording processing of copy data on the second medium 150 (see FIG. 2) such as a HD or an R or RE disk as a copy destination medium.

As explained above, the copy processing is executed according to the following sequence:

(1) readout of encrypted content from the first medium 110 (the copy source medium);

(2) decryption processing of the encrypted content conforming to the first management system corresponding to the first medium 110 (the copy source medium);

(3) encryption processing of content conforming to the second management system corresponding to the second medium 150 (the copy destination medium); and (4) recording processing of the encrypted content on the second medium 150 (the copy destination medium).

The processing explained with reference to the flowchart shown in FIG. 10 is processing for executing processing for copying stored content of the first medium to the second medium without performing reproduction processing of the copy target content.

A sequence in, first, executing reproduction processing of stored content of the first medium and, after starting the reproduction processing of the content, performing copy processing on the second medium is explained with reference to a flowchart shown in FIG. 11. During the content reproduction, for example, a copy execution button is displayed as a UI on the display of the information processing apparatus 120. This is a sequence in which the user starts copy processing by performing operation of this button, for example, remote control operation.

Figure 11:
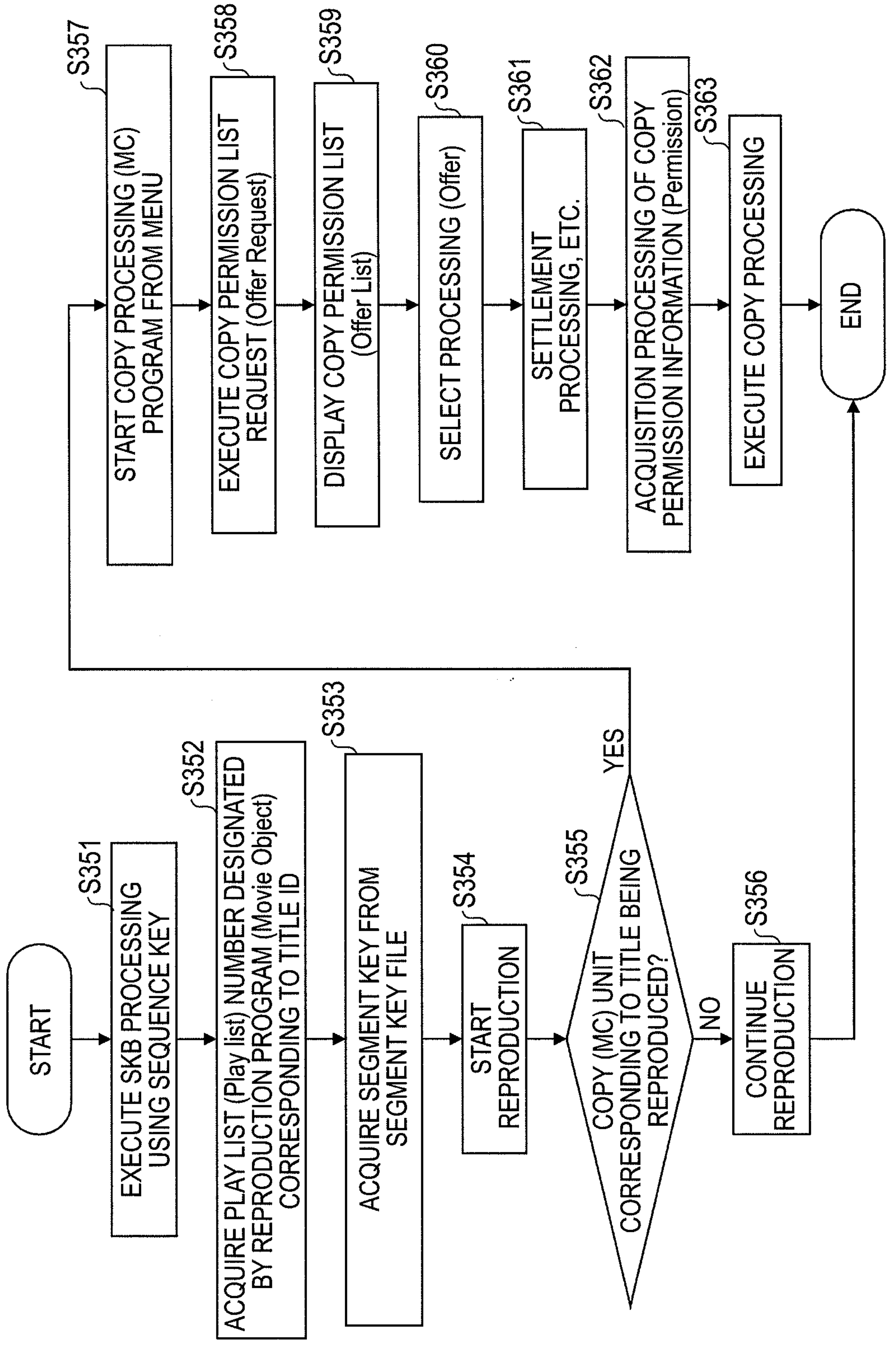
FIG. 11 is a flowchart for explaining a sequence of copy processing performed by using the copy processing information (dealManifest) according to the embodiment of the present invention.

A flow shown in FIG. 11 is also executed in the information processing apparatus 120 shown in FIG. 2. For example, the control unit having the CPU of the information processing apparatus 120 executes the computer program (the copy processing (MC: Managed Copy) program) stored in advance in the memory in the information processing apparatus 120 and performs processing.

Processing in processing steps of the flowchart shown in FIG. 11 is explained.

Processing in steps S351 to S354 is a content reproduction sequence to which a sequence key and a segment key are applied.

In step S351, the information processing apparatus 120 executes the SKB processing explained with reference to FIG. 8 by applying a sequence key stored in the memory in the information processing apparatus 120.

Subsequently, in step S352, the information processing apparatus 120 acquires a play list (Play list) number selected by a reproduction program (Movie Object) corresponding to title information selected as a reproduction target by the user. This processing is equivalent to the acquisition processing of a classification number by the SKB processing explained with reference to FIG. 8.

In step S353, the information processing apparatus 120 acquires a segment key from the segment key file. This processing is equivalent to the acquisition processing of a segment key by the decryption processing of the segment key file 243 to which the media key variable acquired by the SKB processing is applied explained with reference to FIG. 8.

In step S354, the information processing apparatus 120 executes decryption processing of a copy target content using a CPS unit key and the segment key. The CPS unit key is acquired from the unit key file on the basis of a unit key ID acquired from the unit key management table explained with reference to FIG. 1 on the basis of the title information selected as the reproduction target. This reproduction target content is content corresponding to the title information and content corresponding to a reproduction path selected by a play list determined on the basis of the processing explained with reference to FIG. 8.

In step S355, the information processing apparatus 120 determines presence or absence of a user input of a copy processing request for a unit included in title corresponding content being reproduced. During the content reproduction, for example, the copy execution button is displayed as UI information on the display of the information processing apparatus 120. The control unit of the information processing apparatus 120 determines presence or absence of operation of the copy execution button. The information processing apparatus 120 may detect input of a copy execution button set in the information processing apparatus 120 or a remote controller attached to the information processing apparatus 120.

When the user input of the copy processing request is not detected in step S355, in step S356, the information processing apparatus 120 continues the reproduction processing.

On the other hand, when the user input of the copy processing request is detected in step S355, the information processing apparatus 120 proceeds to step S357.

In step S357, the user selects the copy processing (MC) program from the menu displayed on the display unit of the information processing apparatus 120 and starts the copy processing (MC) program.

Subsequently, in step S358, the information processing apparatus 120 executes a copy permission list request (Offer Request). This processing corresponds to the processing in step S11 explained with reference to FIG. 2 and is performed as transmission processing of a copy permission list request (Offer Request) to the management server 140.

In step S359, the information processing apparatus 120 displays a copy permission list (Offer list) received from the management server 140 on the display unit of the information processing apparatus 120. This list is display information generated on the basis of the copy processing information (dealManifest) as the XML description data explained with reference to FIG. 9.

When the information processing apparatus 120 is configured to automatically execute the transmission processing of the copy permission list request (Offer Request) to the management server 140 when a disk is inserted rather than when the copy processing is executed, the copy permission list is already stored in the memory in the information processing apparatus 120. Therefore, communication with the management server 140 is omitted in the processing in steps S358 to S359. Processing for reading out the copy permission list from the memory in the information processing apparatus 120 and displaying the copy permission list is performed.

In step S360, the information processing apparatus 120 performs selection of processing (Offer). Specifically, the information processing apparatus 120 specifies copy target data. This processing is performed as input processing of selected information via the input unit by the user. The user can designate a title included in display information generated on the basis of the copy processing information (dealManifest) explained with reference to FIG. 9.

When the copy target data is determined, the information processing apparatus 120 transmits information concerning the copy target data to the management server 140. In step S361, the information processing apparatus 120 executes settlement processing conforming to a sequence specified in advance. This processing is equivalent to the processing to which the settlement data 131 is applied shown in FIG. 2.

When the settlement processing in step S361 is completed, the information processing apparatus 120 proceeds to step S362 and receives copy permission information (Permission) from the management server 140. This processing is the reception processing of the copy permission information 122 shown in FIG. 2.

In step S363, the information processing apparatus 120 performs recording processing of copy data on the second medium 150 (see FIG. 2) such as a HD or an R or RE disk as a copy destination medium. The decryption processing is performed as processing performed by using the segment key acquired in step S353 and a CPS unit key acquired on the basis of the title information.

This processing example is the configuration for executing copy of content that can be reproduced according to a reproduction path set to correspond to the information processing apparatus 120 explained with reference to FIG. 7. In this copy processing, decryption processing performed by using a CPS unit key and a segment key is necessary.

In this processing example, the information processing apparatus 120 that executes copy processing is configured to record the title information shown in FIG. 9 and refer to the copy processing information (dealManifest) in which play list file names are recorded. Further, the information processing apparatus 120 is configured to start the copy processing after acquiring a classification number as play list identification information corresponding to a play list file name and acquiring a segment key according to the processing performed by using a sequence key explained with reference to FIG. 8.

With these kinds of processing, it is possible to execute the copy processing after acquiring and decrypting, without an error, content conforming to a reproduction path corresponding to the information processing apparatus 120.

In the copy processing of content in which the reproduction conforming to the reproduction path set to correspond to the information processing apparatus 120 is performed, processing is executed according to a procedure explained below.

The information processing apparatus 120 acquires a CPS unit key by applying title designation information designated by applying the copy processing information (dealManifest) shown in FIG. 9.

The information processing apparatus 120 executes the SKB processing shown in FIG. 8 and acquires a classification number (identification information that can specify a play list name) for specifying a play list for executing reproduction of the reproduction path (see FIG. 7) set to correspond to the information processing apparatus 120.

The information processing apparatus 120 acquires a play list usable by the information processing apparatus 120 using a play list name recorded in the copy processing information (dealManifest) shown in FIG. 9 by using the classification number.

Further, the information processing apparatus 120 executes, using a segment key and a CPS unit key obtained as a result of the SKB processing shown in FIG. 8, decryption processing of content (an AV stream file) designated by the selected play list and performs copy processing.

In the copy processing, the information processing apparatus 120 also executes copy processing of a play list and a clip information file designated by the play list.

Smooth copy processing is realized by such processing.

[5. Measures for Reproduction Content to be Reproduced by Using a Content Code]

Measures for realizing smooth copy processing when content as a copy target, i.e., the encrypted content 113 recorded on the first medium 110 such as a ROM disk shown in FIG. 2 is content that can be reproduced by processing performed by using a content code are explained below.

Figure 12:
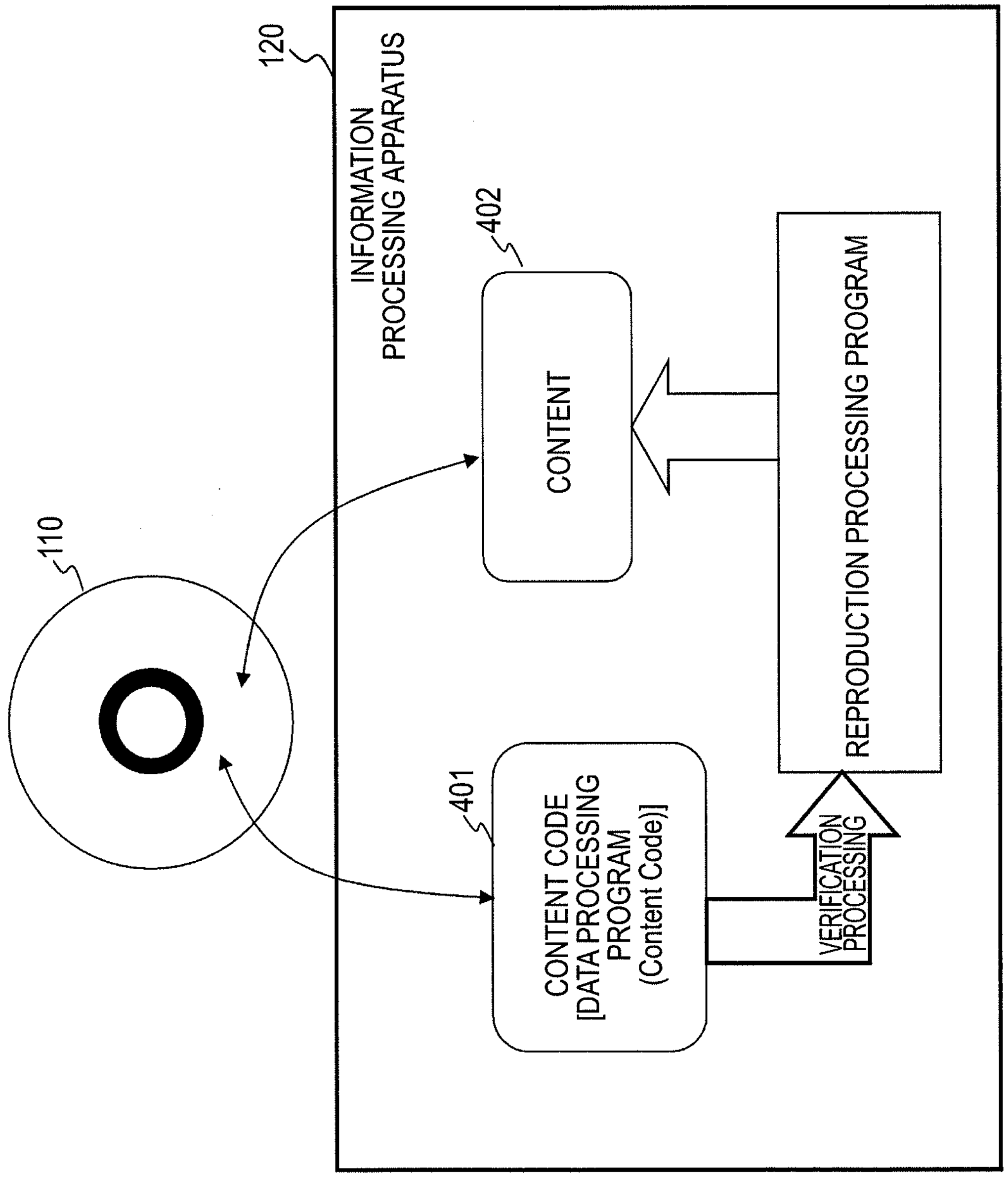
FIG. 12 is a diagram for explaining reproduction processing to which a content code is applied.

First, content reproduction processing to be reproduced by using a content code is explained with reference to FIG. 12. In FIG. 12, the first medium 110 in which reproduction content to be reproduced by using a content code is recorded and the information processing apparatus 120 that executes reproduction processing of recorded content of the first medium 110 are shown.

As shown in FIG. 12, a content code 401 is recorded on the first medium 110 together with content 402. As the content code 401, there are various types.

For example, there are a content code for executing verification processing for verifying whether reproduction processing of the content 402 is correctly executed in a sequence specified in advance or verifying, for example, propriety of the content 402 and a content code for executing conversion processing of structure data of the content 402.

The content codes are computer programs for executing such various kinds of processing and are executed in the information processing apparatus that executes reproduction processing.

For example, the content code 401 shown in FIG. 12 is a content code for executing verification processing for verifying whether reproduction processing of the content 402 is correctly executed in a sequence specified in advance. When the information processing apparatus 120 reproduces the content 402 read out from the first medium 110, the information processing apparatus 120 verifies (checks) a reproduction sequence of the information processing apparatus 120 using the content code 401. For example, specifically, the information processing apparatus 120 performs verification processing for verifying whether the reproduction processing is correctly executed according to a specified sequence such as a sequence of a title #1, a title #2, a title #3, and the like or whether designation of a title is correctly performed after display of a menu.

When it is detected that processing conforming to such specified sequence is not executed, the reproduction processing is forcibly stopped.

Figure 13:
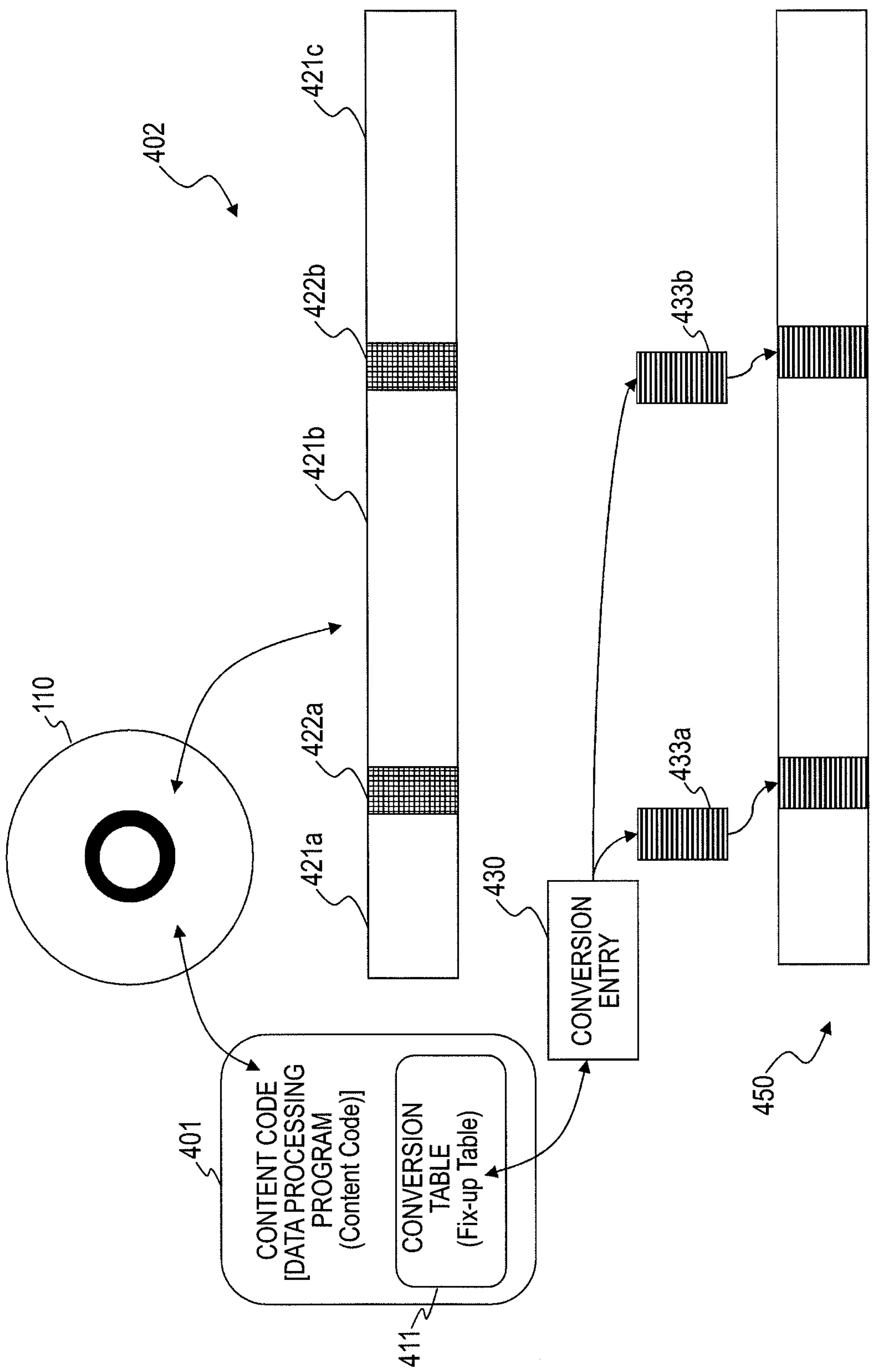
FIG. 13 is a diagram for explaining content conversion processing to which the content code is applied.

The content code 401 shown in FIG. 13 is an example of a content code for executing conversion processing of structure data of the content 402.

As shown in FIG. 13, the content 402 recorded on the first medium 110 includes normal content data 421_a_, 421_b_, 421_c_, and the like not modified and broken data 422$a$, 422$b$, and the like that is modified and broken content. The broken data 422 is data obtained by breaking original content through data processing. Therefore, normal content reproduction may be unable to be executed by applying the content 402 including the broken data.

In order to perform content reproduction, it is necessary to perform processing for replacing the broken data 422$a$, 422$b$, and the like included in the recorded content 402 with normal content data and generate reproduction content 450. Data for conversion (conversion data) as normal content corresponding to broken data areas is acquired from a conversion entry 430 registered in a conversion table (FUT (Fix-Up Table)) 411 in the content code 401. Processing for replacing data in the broken data areas with conversion data 433$a$, 433$b$, and the like acquired from the conversion entry 430 is executed to generate the reproduction content 450 and execute reproduction.

The structure of such a content code is described in Japanese Patent No. 4140624 filed earlier by the applicant.

When copy is executed for content that are reproduced on condition that verification processing of a reproduction sequence and content to which a content code is applied in this way is executed or content structure data conversion processing is executed, as in the reproduction processing, it is necessary to execute the verification processing to which a content code is applied or the data conversion processing.

A sequence of copy processing of such content code applied content is explained with reference to FIG. 14.

Figure 14:
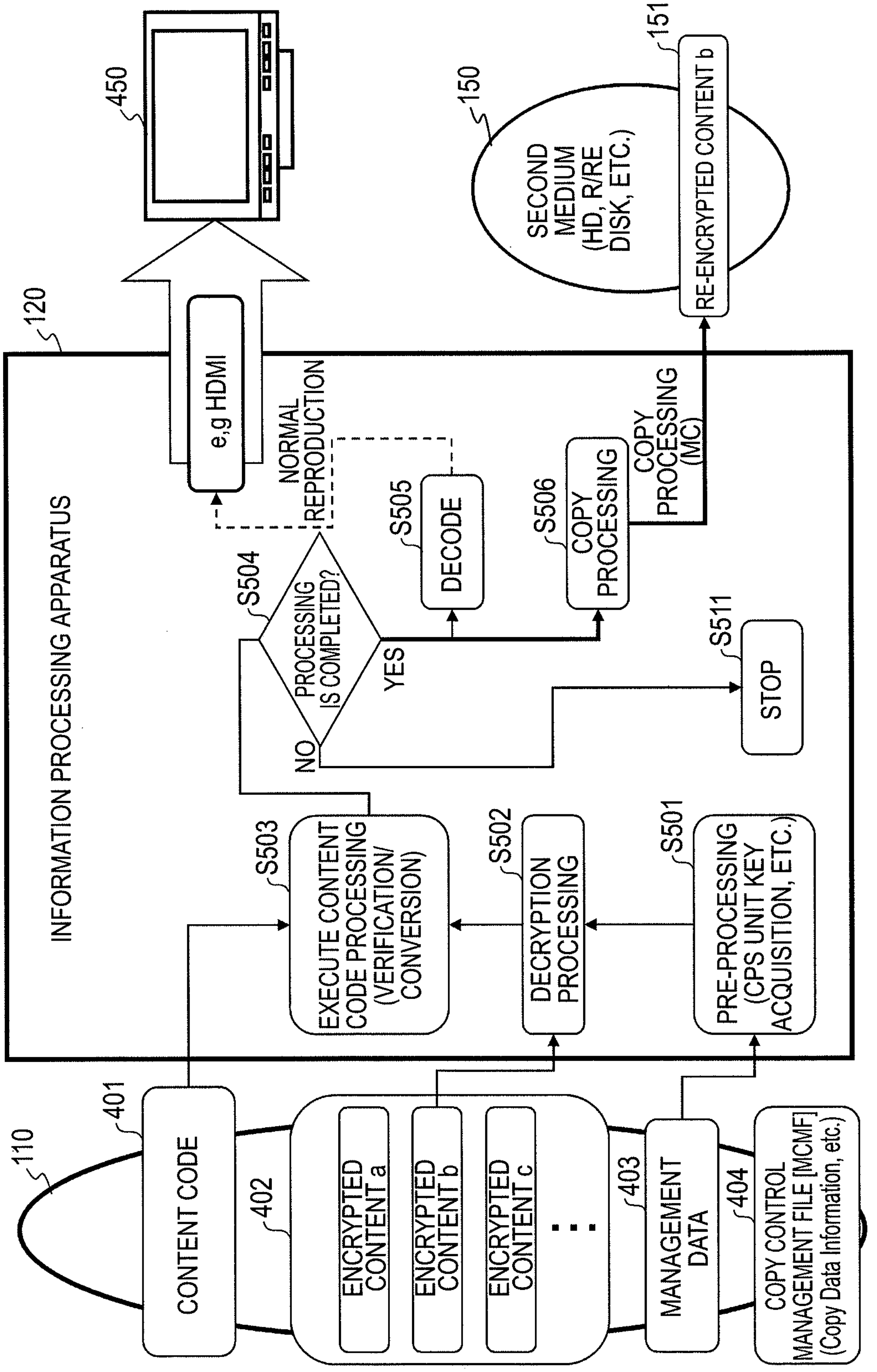
FIG. 14 is a diagram for explaining a sequence of reproduction processing and copy processing of content reproduced by applying the content code.

In FIG. 14, the first medium 110 that stores the content 402, which, when reproduced, needs to be subjected to verification processing or conversion processing and to which a content code is applied, and the information processing apparatus 120 that executes reproduction and copy processing of the content 402 are shown. The first medium 110 corresponds to the first medium 110 shown in FIG. 2.

The first medium 110 stores the content 402, the content code 401, management data 403, and a copy control management file (MCMF) 404. Like the first medium 110 shown in FIG. 2, the first medium 110 is a medium that stores content at a copy source. Key information or the like such as a CPS unit key is stored in the management data 403. A file (MCMF) including the copy processing information (dealManifest) explained with reference to FIG. 5 and the like above is stored in the copy control management file (MCMF) 404.

A display device 450 shown on the right side of FIG. 14 is used as a display unit for reproduction content. The second medium 150 is a copy destination medium of recorded content of the first medium 110 and includes, for example, a HD or an R or RE disk.

When the information processing apparatus 120 performs copy processing of content, first, the information processing apparatus 120 performs content reproduction processing. First, in step S501, the information processing apparatus 120 executes pre-processing. Specifically, the information processing apparatus 120 acquires, from the management data 403, a CPS unit key used for decryption of reproduction content designated by the user.

The information processing apparatus 120 displays an initial menu including title selection information on the display device 450. The information processing apparatus 120 starts the content reproduction processing according to title selection by the user. Therefore, the information processing apparatus 120 acquires a necessary CPS unit key from a title on the basis of correspondence data of the unit key management table explained with reference to FIG. 1 above.

In step S502, the information processing apparatus 120 executes decryption processing of the content 402 using the CPS unit key.

Thereafter, in step S503, the information processing apparatus 120 performs processing to which the content code 401 is applied. The content code applied processing is, for example, verification processing for verifying a reproduction sequence and propriety of content explained with reference to FIG. 12 or conversion processing of content explained with reference to FIG. 13.

When the content code applied processing is completed (Yes in step S504), the information processing apparatus 120 executes decryption processing for reproduction processing of content (step S505) or content copy processing (step S506).

When the content code applied processing is not completed, for example, when it is detected in reproduction sequence verification processing by a content code that processing conforming to a reproduction sequence specified in advance is not executed or when the information processing apparatus 120 fails in conversion processing by conversion data (No in step S504), the information processing apparatus 120 proceeds to step S511 and stops the processing.

In the content copy processing in step S506, processing to which the copy control management file (MCMF) 404 is applied is performed. Specifically, the processing explained with reference to the flowchart of FIG. 6 is executed.

Specifically, the user selects the copy processing (MC) program from the menu displayed on the display unit of the information processing apparatus 120 or the display device 450 shown in FIG. 14 and starts the copy processing (MC) program. The information processing apparatus 120 executes the copy permission list request (Offer Request) and transmits the copy permission list request (Offer Request) to the management server.

The information processing apparatus 120 displays the copy permission list (Offer list) received from the management server on the display unit. The information processing apparatus 120 displays, for example, display information generated on the basis of the copy processing information (dealManifest) as the XML description data explained with reference to FIG. 5.

The information processing apparatus 120 executes copy target data according to, for example, title designation and executes settlement processing conforming to a sequence specified in advance. This processing is equivalent to the processing to which the settlement data 131 is applied shown in FIG. 2. When the settlement processing is completed, the information processing apparatus 120 receives the copy permission information (Permission) from the management server. This is the reception processing of the copy permission information 122 shown in FIG. 2. After these kinds of processing, the information processing apparatus 120 executes copy processing.

In this copy processing, decryption processing in unit of the unit is executed. In this case, since a CPS unit key is already selected by title designation during selection of reproduction content, it is unnecessary to select a CPS unit key anew.

For example, when a unit as a copy target is only a unit as a part of reproduction content, in the copy processing, the information processing apparatus 120 can select, on the basis of a title selected from the copy processing information (dealManifest) explained with reference to FIG. 5, a CPS unit key applied to the copy processing and perform the decryption processing.

As explained above, when the copy target content is content to be a verification or conversion processing target by a content code (content code applied content), in the copy processing, the information processing apparatus 120 performs processing explained below.

Before starting the copy processing, the information processing apparatus 120 executes content reproduction processing conforming to a specified reproduction sequence and executes verification processing and conversion processing performed by using a content code.

Thereafter, the information processing apparatus 120 shifts to the copy processing.

In the copy processing, the information processing apparatus 120 acquires a CPS unit key by applying title designation information designated during reproduction by applying the copy processing information (dealManifest) shown in FIG. 5 or 9, decrypts the content as the copy target in unit of a CPS unit, and performs the copy processing by applying the acquired CPS unit key.

Smooth copy processing is realized by these kinds of processing.

[6. An Embodiment for Discriminating a Data Type of a Copy Source and Executing Copy Processing]

As explained above, as types of data to be a copy target recorded on the first medium, there are various contents. For example, data types (content types) can be sectioned into the following three contents:

(a) content encrypted by a CPS unit key (unit encrypted content);

(b) content reproduced by selecting a reproduction path selected by a play list corresponding to the information processing apparatus encrypted by the CPS unit key and a segment key (reproduction path designated content); and (c) content as a verification or conversion processing target by a content code (content code applied content).

All the contents (a) to (c) are contents encrypted in unit of the unit.

The information processing apparatus that executes copy processing needs to perform different processing according to which one of the above contents content as a copy target is.

In the following explanation, an embodiment in which the information processing apparatus discriminates these content forms (content types) and executes copy processing corresponding to a discrimination result is explained with reference to flowcharts shown in FIGS. 15 and 16.

Figure 15:
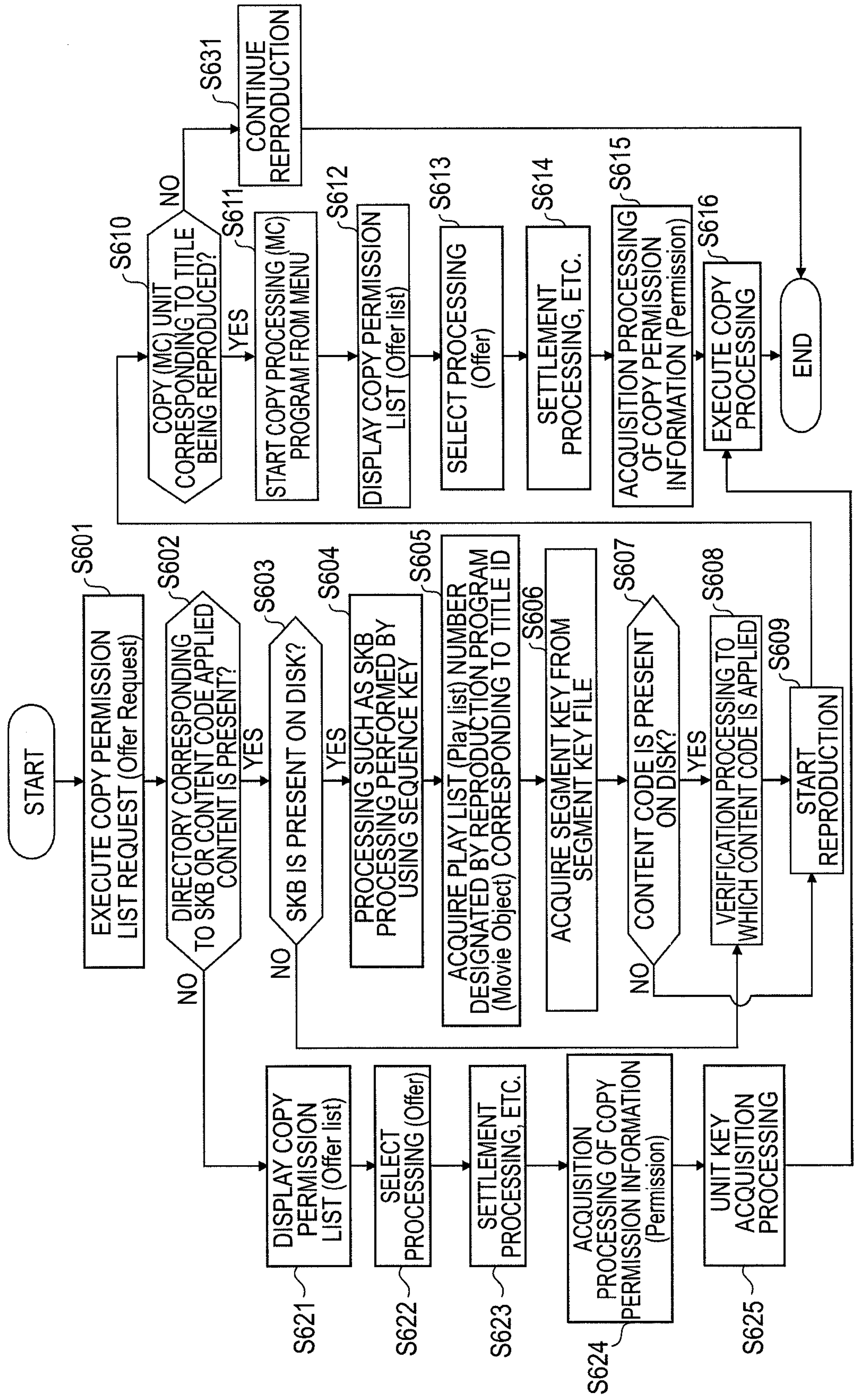
FIG. 15 is a flowchart for explaining a sequence for discriminating a type of content, executing processing different according to the type, and performing copy processing of the content.

The flowchart shown in FIG. 15 is a sequence in the case in which the information processing apparatus 120 shown in FIG. 2 executes transmission of the copy permission list request (Offer Request) to the management server 140 when the first medium 110 having copy target content recorded thereon is inserted and, after receiving the copy permission list (Offer list) from the management server 140 and storing the copy permission list (Offer list) in the memory in the information processing apparatus 120 in advance, starts the copy processing program (MC program) and executes copy processing.

Figure 16:
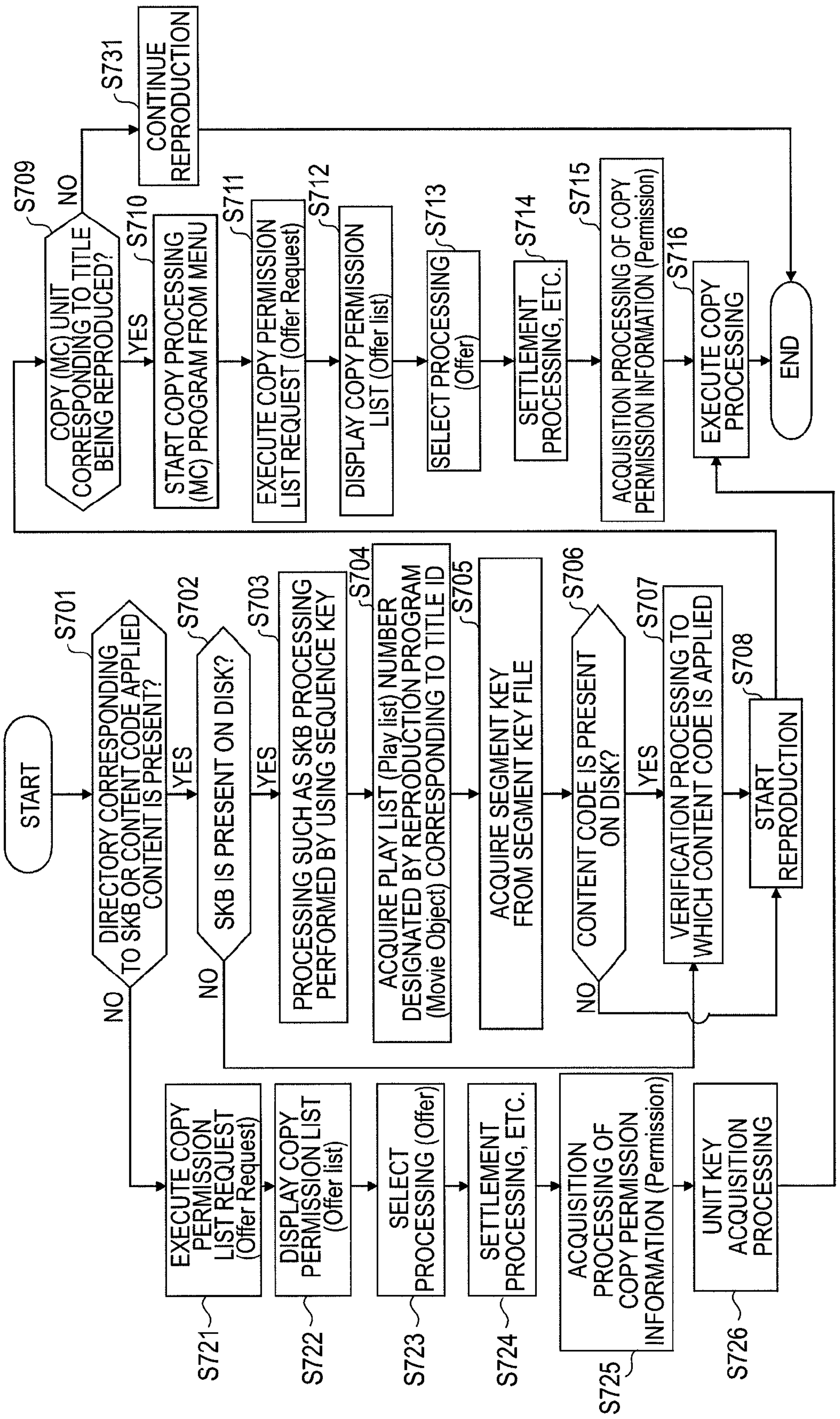
FIG. 16 is a flowchart for explaining a sequence for discriminating a type of content, executing processing different according to the type, and performing copy processing of the content.

On the other hand, the flowchart shown in FIG. 16 is a sequence in the case in which, when the information processing apparatus 120 shown in FIG. 2 executes copying, the information processing apparatus 120 starts the copy processing program (MC program), thereafter, executes transmission of the copy permission list request (Offer Request) to the management server 140, and, immediately before copy execution, receives the copy permission list (Offer list) from the management server 140 and performs copy processing.

In the sequence of the flowchart shown in FIG. 15, the information processing apparatus 120 receives the copy permission list (Offer list) from the management server 140 in advance when a disk is inserted, stores the copy permission list (Offer list), and executes processing. This sequence is explained below with reference to the flowchart shown in FIG. 15.

This processing flow is a sequence in which the information processing apparatus 120 discriminates a type (a content form) of a content as a copy target, i.e., content recorded on the first medium 110 shown in FIG. 2 and executes copy processing corresponding to a discrimination result.

A flow shown in FIG. 15 is executed in the information processing apparatus 120 shown in FIG. 2. For example, the control unit having the CPU of the information processing apparatus 120 executes the computer program (the copy processing (MC: Managed copy) program) stored in advance in the memory in the information processing apparatus 120 and performs processing.

Processing in processing steps of the flowchart shown in FIG. 15 is explained.

In step S601, the user selects the copy processing (MC) program from the menu displayed on the display unit of the information processing apparatus 120 and starts the copy processing (MC) program. The information processing apparatus 120 executes the copy permission list request (Offer Request). This processing corresponds to the processing in step S11 explained with reference to FIG. 2 and is performed as transmission processing of the copy permission list request (Offer Request) to the management server 140. In this way, the flow shown in FIG. 15 is a flow for causing the information processing apparatus 120 to automatically execute the transmission processing of the copy permission list request (Offer Request) to the management server 140 when a disk is inserted. According to this processing, a copy permission list acquired from the management server 140 is stored in the memory in the information processing apparatus 120.

Subsequently, in step S602, the information processing apparatus 120 verifies directories of the first medium 110 (see FIG. 2) having content at a copy source recorded thereon and executes processing for checking whether there is a directory in which content or data corresponding to reproduction path designated content or content code applied content is set.

As explained above, the copy target data recorded on the first medium 110 is any one of the following types (a) to (c):

(a) content encrypted by a CPS unit key (unit encrypted content);

(b) content reproduced by selecting a reproduction path selected by a play list corresponding to the information processing apparatus encrypted by the CPS unit key and a segment key (reproduction path designated content); and (c) content as a verification or conversion processing target by a content code (content code applied content).

When the information processing apparatus 120 determines in step S602 that, in the directories of the first medium 110 having the content at the copy source recorded thereon, there is no directory in which content or data corresponding to the reproduction path designated content or the content code applied content is set, the information processing apparatus 120 determines that the content of the first medium 110, i.e., the copy target content is the content encrypted by the CPS unit key (unit encrypted content) in (a) above.

In this case, after executing processing in steps S621 to S625, in step S616, the information processing apparatus 120 performs copy processing. Specifically, the information processing apparatus 120 sequentially executes processing explained below.

Step S621

The information processing apparatus 120 displays the copy permission list (Offer list) received from the management server 140 on the display unit of the information processing apparatus 120. According to the processing in step S601, the information processing apparatus 120 extracts the copy permission list (Offer list), which is received when the disk is inserted, from the memory and displays the copy permission list (Offer list). This list is display information generated on the basis of the copy processing information (dealManifest) as the XML description data explained with reference to FIG. 5.

Step S622

The information processing apparatus 120 performs selection of processing (Offer). Specifically, the information processing apparatus 120 specifies copy target data. This processing is performed as, for example, input processing of selected information via an input unit by the user. The user can designate, for example, a title included in display information generated on the basis of the copy processing information (dealManifest) explained with reference to FIG. 5. When the copy target data is determined, the information processing apparatus 120 transmits information concerning the copy target data to the management server 140.

Step S623

The information processing apparatus 120 executes settlement processing conforming to a sequence specified in advance. This processing is equivalent to the processing to which the settlement data 131 is applied shown in FIG. 2.

Step S624

The information processing apparatus 120 receives the copy permission information (Permission) from the management server 140. This processing is the reception processing of the copy permission information 122 shown in FIG. 2.

Step S625

The information processing apparatus 120 acquires a CPS unit key as a decryption key applied to the copy target data (the CPS unit) on the basis of the title information selected as the copy target. The information processing apparatus 120 acquires the CPS unit key from the unit key file on the basis of a unit key ID acquired from the unit key management table explained with reference to FIG. 1 on the basis of the title information selected as the reproduction target.

Step S616

The information processing apparatus 120 executes decryption processing of content selected to correspond to the title information and performs copy processing by applying the CPS unit key acquired in step S625. In recording processing on the second medium in the copy processing, it is desirable to perform re-encryption conforming to a content management system corresponding to the second medium. This processing is, for example, re-encryption processing conforming to various content management systems corresponding to media such as CPRM, Magic Gate, and VCPS.

Processing performed in the case of Yes in step S602 is explained below. Specifically, the processing is processing performed when it is determined in step S602 that, in the directories of the first medium 110 in which the content at the copy source is recorded, there is no directory in which content or data corresponding to the reproduction path designated content or the content code applied content is set. In this case, the information processing apparatus 120 determines that the copy target content recorded on the first medium 110 is one of the following:

(b) content reproduced by selecting a reproduction path selected by a play list corresponding to the information processing apparatus encrypted by a CPS unit key and a segment key (reproduction path designated content); and (c) content as a verification or conversion processing target by a content code (content code applied content).

In this case, in the next step S603, the information processing apparatus 120 determines whether a sequence key block (SKB) is recorded on the first medium 110 having the copy target content recorded thereon. As explained with reference to FIG. 8, the sequence key block (SKB) is a block in which key information applied during reproduction of the reproduction path designated content is stored. If the sequence key block (SKB) is present, the information processing apparatus 120 determines that the content recorded on the first medium 110 is the reproduction path designated content.

When the information processing apparatus 120 determines in step S603 that the sequence key block (SKB) is present on the disk (the first medium 110), the information processing apparatus 120 proceeds to step S604. When the information processing apparatus 120 determines that the sequence key block (SKB) is not present, the information processing apparatus 120 proceeds to step S608. When the information processing apparatus 120 determines that the sequence key block (SKB) is not present, the information processing apparatus 120 determines that the content recorded on the first medium 110 is the content code applied content.

When the information processing apparatus 120 determines in step S603 that the sequence key block (SKB) is recorded on the disk (the first medium 110) and the recorded content is the reproduction path designated content, the information processing apparatus 120 proceeds to step S604. The information processing apparatus 120 executes the SKB processing explained with reference to FIG. 8 by applying the sequence key stored in the memory in the information processing apparatus 120.

In step S605, the information processing apparatus 120 acquires a play list (Play list) number designated by a reproduction program (Movie Object) corresponding to the title information selected as the reproduction target by the user. This is equivalent to the acquisition processing of a classification number by the SKB processing explained with reference to FIG. 8.

In step S606, the information processing apparatus 120 acquires a segment key from the segment key file. This processing is equivalent to the acquisition processing of the segment key by the decryption processing of the segment key file 243 to which the media key variable acquired by the SKB processing is applied explained with reference to FIG. 8.

In step S607, the information processing apparatus 120 verifies whether a content code is present on the disk. When the content code is not present, the information processing apparatus 120 proceeds to step S609. When the content code is present, the information processing apparatus 120 proceeds to step S608.

When the content code is not present on the disk, the information processing apparatus 120 executes decryption processing and reproduction processing of the copy target content using a CPS unit key and the segment key. The CPU unit key is acquired from the unit key file on the basis of a unit key ID acquired from the unit key management table explained with reference to FIG. 1 on the basis of the title information selected as the reproduction target. This reproduction target content is content corresponding to the title information and content corresponding to a reproduction path selected by a play list determined on the basis of the processing explained with reference to FIG. 8.

On the other hand, when the information processing apparatus 120 determines in step S603 that the sequence key block (SKB) is not present on the disk (the first medium 110), the information processing apparatus 120 determines that the content recorded on the first medium 110 is the content code applied content and proceeds to step S608. The information processing apparatus 120 also proceeds to step S608 when the information processing apparatus 120 determines in step S607 that the content code is present on the disk.

In step S608, the information processing apparatus 120 performs processing to which the content code is applied. This content code applied processing is, for example, the verification (check) processing of a reproduction sequence explained with reference to FIG. 12 or the conversion processing of content explained with reference to FIG. 13.

When the content code applied processing is completed, the information processing apparatus 120 proceeds to step S609. The information processing apparatus 120 executes decryption processing for reproduction processing of content and starts the content reproduction processing. When the content code applied processing is not completed, for example, in reproduction sequence verification processing by a content code, when it is detected that processing conforming to a reproduction sequence specified in advance is not executed or when the information processing apparatus 120 fails in conversion processing by conversion data, the information processing apparatus 120 stops the reproduction processing.

After starting the content reproduction processing in step S609, in step S610, the information processing apparatus 120 determines presence or absence of a user input of a copy processing request for a unit included in title associated content being reproduced. During the content reproduction, for example, the copy execution button is displayed as UI information on the display of the information processing apparatus 120. The control unit of the information processing apparatus 120 determines presence or absence of operation of the copy execution button. The information processing apparatus 120 may detect input of the copy execution button set in the information processing apparatus 120 or the remote controller attached to the information processing apparatus 120.

When the user input of the copy processing request is not detected in step S610, in step S631, the information processing apparatus 120 continues the reproduction processing.

On the other hand, when the user input of the copy processing request is detected in step S610, the information processing apparatus 120 proceeds to step S611.

In step S611, the user selects the copy processing (MC) program from the menu displayed on the display unit of the information processing apparatus 120 and starts the copy processing (MC) program.

In step S612, the information processing apparatus 120 acquires, from the memory of the information processing apparatus 120, the copy permission list (Offer list) received from the management server 140 when the first medium 110 is inserted and displays the copy permission list (Offer list) on the display unit. This list is display information generated on the basis of the copy processing information (dealManifest) as the XML description data explained with reference to FIG. 5 or 9.

When the copy target data is the reproduction path designated content, the copy processing information (dealManifest) shown in FIG. 9 can be used. The copy processing information (dealManifest) shown in FIG. 5 includes all recorded data of the copy processing information (dealManifest) shown in FIG. 9. The copy processing information dealManifest) shown in FIG. 5 can be used either when the copy target data is the reproduction path designated content or when the copy target data is the content code applied content. The copy processing information (dealManifest) shown in FIG. 5 may be used in common.

In step S613, the information processing apparatus 120 performs selection of processing (Offer). Specifically, the information processing apparatus 120 specifies copy target data. This processing is performed as input processing of selected information via the input unit by the user. The user can designate, for example, a title included in display information generated on the basis of the copy processing information (dealManifest) explained with reference to FIG. 5 or 9.

When the copy target data is determined, the information processing apparatus 120 transmits information concerning the copy target data to the management server 140. In step S614, the information processing apparatus 120 executes settlement processing conforming to a sequence specified in advance. This processing is equivalent to the processing to which the settlement data 131 is applied shown in FIG. 2.

When the settlement processing in step S614 is completed, the information processing apparatus 120 proceeds to step S615 and receives copy permission information (Permission) from the management server 140. This processing is the reception processing of the copy permission information 122 shown in FIG. 2.

In step S616, the information processing apparatus 120 performs recording processing of copy data on the second medium 150 (see FIG. 2) such as a HD or an R or RE disk as a copy destination medium.

In the copy processing, when the copy target content is the reproduction path designated content, the decryption processing of content is performed as processing performed by using the segment key acquired in step S606 and a CPS unit key acquired on the basis of the title information.

In this case, decryption processing of content reproduced according to a reproduction path set to correspond to the information processing apparatus explained with reference to FIG. 7 is performed.

On the other hand, when the copy target content is the content code applied content, the decryption processing of content is performed as processing performed by using a CPS unit key acquired on the basis of the title information.

In the sequence of the flowchart shown in FIG. 16, when the information processing apparatus 120 shown in FIG. 2 executes copying, after starting the copy processing program (MC program), the information processing apparatus 120 executes transmission of the copy permission list request (Offer Request) to the management server 140, and, immediately before copy execution, receives the copy permission list (Offer list) from the management server 140 and performs copy processing. This sequence is explained below with reference to the flowchart shown in FIG. 16.

This processing flow is also a sequence in which the information processing apparatus 120 discriminates a type (a content form) of a content as a copy target, i.e., content recorded on the first medium 110 shown in FIG. 2 and executes copy processing corresponding to a discrimination result.

The flow shown in FIG. 16 is executed in the information processing apparatus 120 shown in FIG. 2. For example, the control unit having the CPU of the information processing apparatus 120 executes the computer program (the copy processing (MC: Managed Copy) program) stored in advance in the memory in the information processing apparatus 120 and performs processing.

Processing in processing steps of the flowchart shown in FIG. 16 is explained.

In step S701, the information processing apparatus 120 verifies directories of the first medium 110 (see FIG. 2) having content at a copy source recorded thereon and executes processing for checking whether there is a direction in which content or data corresponding to reproduction path designated content or content code applied content is set.

The copy target data recorded on the first medium 110 is any one of the following types (a) to (c):

(a) content encrypted by a CPS unit key (unit encrypted content);

(b) content reproduced by selecting a reproduction path selected by a play list corresponding to the information processing apparatus encrypted by the CPS unit key and a segment key (reproduction path designated content); and (c) content as a verification or conversion processing target by a content code (content code applied content).

When the information processing apparatus 120 determines in step S702 that, in the directories of the first medium 110 having the content at the copy source recorded thereon, there is no directory in which content or data corresponding to the reproduction path designated content or the content code applied content is set, the information processing apparatus 120 determines that the content of the first medium 110 is the content encrypted by the CPS unit key (unit encrypted content) in (a) above.

In this case, after executing processing in steps S721 to S726, in step S716, the information processing apparatus 120 performs copy processing. Specifically, the information processing apparatus 120 sequentially executes processing explained below.

Step S721

The user selects the copy processing (MC) program from the menu displayed on the display unit of the information processing apparatus 120 and starts the copy processing (MC) program. The information processing apparatus 120 executes the copy permission list request (Offer Request). This processing corresponds to the processing in step S11 explained with reference to FIG. 2 and is performed as transmission processing of the copy permission list request (Offer Request) to the management server 140.

Step S722

The information processing apparatus 120 displays the copy permission list (Offer list) received from the management server 140 on the display unit of the information processing apparatus 120. This list is display information generated on the basis of the copy processing information (dealManifest) as the XML description data explained with reference to FIG. 5.

Step S723

The information processing apparatus 120 performs selection of processing (Offer). Specifically, the information processing apparatus 120 specifies copy target data. This processing is performed as, for example, input processing of selected information via the input unit by the user. The user can designate, for example, a title included in display information generated on the basis of the copy processing information (dealManifest) explained with reference to FIG. 5. When the copy target data is determined, the information processing apparatus 120 transmits information concerning the copy target data to the management server 140.

Step S724

The information processing apparatus 120 executes settlement processing conforming to a sequence specified in advance. This processing is equivalent to the processing to which the settlement data 131 is applied shown in FIG. 2.

Step S725

The information processing apparatus 120 receives the copy permission information (Permission) from the management server 140. This processing is the reception processing of the copy permission information 122 shown in FIG. 2.

Step S726

The information processing apparatus 120 acquires a CPS unit key as a decryption key applied to the copy target data (the CPS unit) on the basis of the title information selected as the copy target. The information processing apparatus 120 acquires the CPS unit key from the unit key file on the basis of a unit key ID acquired from the unit key management table explained with reference to FIG. 1 on the basis of the title information selected as the reproduction target.

Step S716

The information processing apparatus 120 executes decryption processing of content selected to correspond to the title information and performs copy processing by applying the CPS unit key acquired in step S726. In recording processing on the second medium in the copy processing, it is desirable to perform re-encryption conforming to a content management system corresponding to the second medium. This processing is, for example, re-encryption processing conforming to various content management systems corresponding to media such as CPRM, Magic Gate, and VCPS.

Processing performed in the case of Yes in step S701 is explained below. Specifically, the processing is processing performed when it is determined in step S701 that, in the directories of the first medium 110 in which the content at the copy source is recorded, there is no directory in which content or data corresponding to the reproduction path designated content or the content code applied content is set. In this case, the information processing apparatus 120 determines that the copy target content recorded on the first medium 110 is one of the following:

(b) content reproduced by selecting a reproduction path selected by a play list corresponding to the information processing apparatus encrypted by a CPS unit key and a segment key (reproduction path designated content); and (c) content as a verification or conversion processing target by a content code (content code applied content).

In this case, in the next step S702, the information processing apparatus 120 determines whether a sequence key block (SKB) is recorded on the first medium 110 having the copy target content recorded thereon. As explained with reference to FIG. 8, the sequence key block (SKB) is a block in which key information applied during reproduction of the reproduction path designated content is stored. If the sequence key block (SKB) is present, the information processing apparatus 120 determines that the content recorded on the first medium 110 is the reproduction path designated content.

When the information processing apparatus 120 determines in step S702 that the sequence key block (SKB) is present on the disk (the first medium 110), the information processing apparatus 120 proceeds to step S703. When the information processing apparatus 120 determines that the sequence key block (SKB) is not present, the information processing apparatus 120 proceeds to step S707. When the information processing apparatus 120 determines that the sequence key block (SKB) is not present, the information processing apparatus 120 determines that the content recorded on the first medium 110 is the content code applied content.

When the information processing apparatus 120 determines in step S702 that the sequence key block (SKB) is recorded on the disk (the first medium 110) and the recorded content is the reproduction path designated content, the information processing apparatus 120 proceeds to step S703. The information processing apparatus 120 executes the SKB processing explained with reference to FIG. 8 by applying the sequence key stored in the memory in the information processing apparatus 120.

In step S704, the information processing apparatus 120 acquires a play list (Play list) number designated by a reproduction program (Movie Object) corresponding to the title information selected as the reproduction target by the user. This is equivalent the acquisition processing of a classification number by the SKB processing explained with reference to FIG. 8.

In step S705, the information processing apparatus 120 acquires a segment key from the segment key file. This processing is equivalent to the acquisition processing of the segment key by the decryption processing of the segment key file 243 to which the media key variable acquired by the SKB processing is applied explained with reference to FIG. 8.

In step S706, the information processing apparatus 120 verifies whether a content code is present on the disk. When the content code is not present, the information processing apparatus 120 proceeds to step S708. When the content code is present, the information processing apparatus 120 proceeds to step S707.

When the content code is not present on the disk, the information processing apparatus 120 executes decryption processing and reproduction processing of the copy target content using a CPS unit key and the segment key. The CPU unit key is acquired from the unit key file on the basis of a unit key ID acquired from the unit key management table explained with reference to FIG. 1 on the basis of the title information selected as the reproduction target. This reproduction target content is content corresponding to the title information and content corresponding to a reproduction path selected by a play list determined on the basis of the processing explained with reference to FIG. 8.

On the other hand, when the information processing apparatus 120 determines in step S702 that the sequence key block (SKB) is not present on the disk (the first medium 110), the information processing apparatus 120 determines that the content recorded on the first medium 110 is the content code applied content and proceeds to step S707. The information processing apparatus 120 also proceeds to step S707 when the information processing apparatus 120 determines in step S706 that the content code is present on the disk.

In step S707, the information processing apparatus 120 performs processing to which the content code is applied. This content code applied processing is, for example, verification (check) processing of a reproduction sequence explained with reference to FIG. 12 or the conversion processing of content explained with reference to FIG. 13.

When the content code applied processing is completed, the information processing apparatus 120 proceeds to step S708. The information processing apparatus 120 executes decryption processing for reproduction processing of content and starts the content reproduction processing. When the content code applied processing is not completed, for example, in reproduction sequence verification processing by a content code, when it is detected that processing conforming to a reproduction sequence specified in advance is not executed or when the information processing apparatus 120 fails in conversion processing by conversion data, the information processing apparatus 120 stops the reproduction processing.

After starting the content reproduction processing in step S708, in step S709, the information processing apparatus 120 determines presence or absence of a user input of a copy processing request for a unit included in title associated content being reproduced. During the content reproduction, for example, the copy execution button is displayed as UI information on the display of the information processing apparatus 120. The control unit of the information processing apparatus 120 determines presence or absence of operation of the copy execution button. The information processing apparatus 120 may detect input of the copy execution button set in the information processing apparatus 120 or the remote controller attached to the information processing apparatus 120.

When the user input of the copy processing request is not detected in step S709, in step S731, the information processing apparatus 120 continues the reproduction processing.

On the other hand, when the user input of the copy processing request is detected in step S709, the information processing apparatus 120 proceeds to step S710.

In step S710, the user selects the copy processing (MC) program from the menu displayed on the display unit of the information processing apparatus 120 and starts the copy processing (MC) program.

In step S711, the user selects the copy processing (MC) program from the menu displayed on the display unit of the information processing apparatus 120 and starts the copy processing (MC) program. The information processing apparatus 120 executes the copy permission list request (Offer Request). This processing corresponds to the processing in step S11 explained with reference to FIG. 2 and is performed as transmission processing of the copy permission list request (Offer Request) to the management server 140.

In step S712, the information processing apparatus 120 acquires, from the memory of the information processing apparatus 120, the copy permission list (Offer list) received from the management server 140 in advance when the first medium 110 is inserted and displays the copy permission list (Offer list) on the display unit. This list is display information generated on the basis of the copy processing information (dealManifest) as the XML description data explained with reference to FIG. 5 or 9.

When the copy target data is the reproduction path designated content, the copy processing information (dealManifest) shown in FIG. 9 can be used. The copy processing information (dealManifest) shown in FIG. 5 includes all recorded data of the copy processing information (dealManifest) shown in FIG. 9. The copy processing information dealManifest) shown in FIG. 5 can be used when the copy target data is the reproduction path designated content and when the copy target data is the content code applied content. The copy processing information (dealManifest) shown in FIG. 5 may be used in common.

In step S713, the information processing apparatus 120 performs selection of processing (Offer). Specifically, the information processing apparatus 120 specifies copy target data. This processing is performed as input processing of selected information via the input unit by the user. The user can designate, for example, a title included in display information generated on the basis of the copy processing information (dealManifest) explained with reference to FIG. 5 or 9.

When the copy target data is determined, the information processing apparatus 120 transmits information concerning the copy target data to the management server 140. In step S714, the information processing apparatus 120 executes settlement processing conforming to a sequence specified in advance. This processing is equivalent to the processing to which the settlement data 131 is applied shown in FIG. 2.

When the settlement processing in step S714 is completed, the information processing apparatus 120 proceeds to step S715 and receives copy permission information (Permission) from the management server 140. This processing is the reception processing of the copy permission information 122 shown in FIG. 2.

In step S716, the information processing apparatus 120 performs recording processing of copy data on the second medium 150 (see FIG. 2) such as a HD or an R or RE disk as a copy destination medium.

In the copy processing, when the copy target content is the reproduction path designated content, the decryption processing of content is performed as processing performed by using the segment key acquired in step S705 and a CPS unit key acquired on the basis of the title information.

In this case, decryption processing of content reproduced according to a reproduction path set to correspond to the information processing apparatus explained with reference to FIG. 7 is performed.

On the other hand, when the copy target content is the content code applied content, the decryption processing of content is performed as processing performed by using a CPS unit key acquired on the basis of the title information.

In the copy processing explained with reference to the flowcharts shown in FIGS. 15 and 16, the information processing apparatus that executes copying of content executes optimum processing according to a type of content recorded on a copy source medium. Specifically, the information processing apparatus discriminates content of which one of the following types (a) to (c) the content recorded on the copy source medium (the medium 110 shown in FIG. 2) is:

(a) content encrypted by a CPS unit key (unit encrypted content);

(b) content reproduced by selecting a reproduction path selected by a play list corresponding to the information processing apparatus encrypted by the CPS unit key and a segment key (reproduction path designated content); and (c) content as a verification or conversion processing target by a content code (content code applied content).

The information processing apparatus executes processing necessary for copy processing corresponding to the respective content types and performs the copy processing according to a result of the discrimination. Specifically, when the copy target content is the content encrypted by the CPS unit key (unit encrypted content) of (a) above, the information processing apparatus performs processing explained below.

The information processing apparatus acquires a CPS unit key by applying title designation information designated by applying the copy processing information (dealManifest) shown in FIG. 5 and decrypts the content of the copy target in unit of a CPS unit and performs the copy processing by applying the acquired CPS unit key.

When the copy target content is the content reproduced by selecting a reproduction path selected by a play list corresponding to the information processing apparatus encrypted by the CPS unit key and a segment key (reproduction path designated content) of (b) above, the information processing apparatus performs processing explained below.

The information processing apparatus acquires a CPS unit key by applying title designation information designated by applying the copy processing information (dealManifest) shown in FIG. 9.

Further, the information processing apparatus executes the SKB processing shown in FIG. 8 and acquires a classification number (identification information that can specify a play list name) for specifying a play list for executing reproduction of the reproduction path (see FIG. 7) set to correspond to the information processing apparatus.

The information processing apparatus acquires a play list usable by the information processing apparatus using a play list name recorded in the copy processing information (dealManifest) shown in FIG. 9 by using the classification number.

Further, the information processing apparatus executes, using a segment key and a CPS unit key obtained as a result of the SKB processing shown in FIG. 8, decryption processing of content (an AV stream file) designated by the selected play list and performs copy processing.

In the copy processing, the information processing apparatus also executes copy processing of a play list and a clip information file designated by the play list.

When the copy target content is the content as a verification or conversion processing target by a content code (content code applied content) of (c) above, the information processing apparatus performs processing explained below.

The information processing apparatus executes content reproduction processing conforming to a specified reproduction sequence and executes verification processing and conversion processing using a content code.

Thereafter, the information processing apparatus shifts to the copy processing.

In the copy processing, the information processing apparatus acquires a CPS unit key by applying title designation information designated during reproduction by applying the copy processing information (dealManifest) shown in FIG. 5 or 9, decrypts the content as the copy target in unit of a CPS unit, and performs the copy processing by applying the acquired CPS unit key.

In this way, in this embodiment, the information processing apparatus executes copy processing according to processing corresponding to a type of the copy target content. According to the content type corresponding processing, optimum processing corresponding to various contents is performed. Therefore, it is possible to smoothly execute the copy processing.

[7. A Configuration Example of the Information Processing Apparatus]

Lastly, a configuration example of the information processing apparatus 120 according to an embodiment of the present invention is explained with reference to FIG. 17. The information processing apparatus 120 has a configuration in which the first medium 110 as a recording medium of a copy source content and the second medium 150 as a copy destination of content can be inserted. However, two media do not always need to be insertable into the information processing apparatus 120. For example, a copy destination medium may be inserted into another apparatus connected to the information processing apparatus 120 by a USB cable, radio communication, or the like and output copy data.

As the first medium 110 and the second medium 150, various media (information recording media) such as a Blu-ray Disc (registered trademark), a DVD, a hard disk, and a flash memory can be used.

Figure 17:
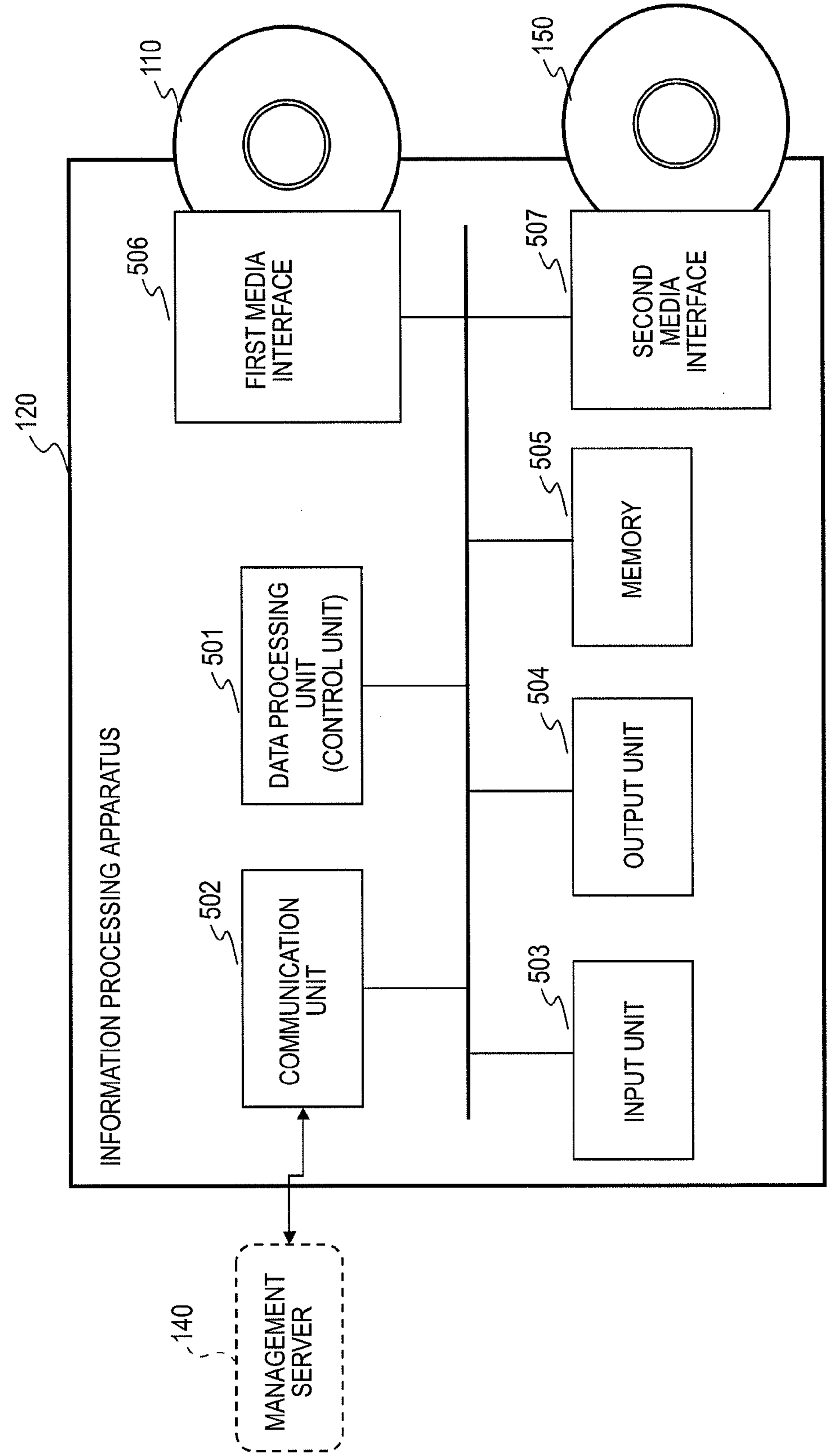
FIG. 17 is a diagram for explaining a configuration example of an information processing apparatus.

The information processing apparatus 120 includes, as shown in FIG. 17, a data processing unit (a control unit) 501, a communication unit 502, an input unit 503, an output unit 504, a memory 505, a first media interface 506, and a second media interface 507.

The data processing unit 501 includes a CPU that has a program execution function for executing various data processing programs. The data processing unit 501 executes computer programs for executing the copy processing conforming to the flowcharts explained above besides, for example, data recording and reproducing processing. Further, the data processing unit 501 performs control of overall processing executed by the apparatus such as communication processing with the management server 140 via the communication unit 502.

The communication unit 502 is used for the communication processing with the management server 140 and performs request and reception of the copy permission list including the copy processing information (dealManifest). Further, the communication unit 502 is used for, for example, the settlement processing or the reception processing of the copy permission information (Permission).

The input unit 503 is, for example, an operation unit operated by a user. Various instructions such as a data recording and reproduction instruction and a copy instruction are input via the input unit 503. The input unit 503 includes a remote controller. Remote controller operation information can also be input. The output unit 504 is an output unit for images and sound including a display and a speaker. The memory 505 includes a RAM or a ROM and is used as, for example, a storage area for computer programs executed by the data processing unit 501, various parameters, and received data. The memory 505 is also used as, for example, a buffer area for copy data.

The first media interface 506 is an interface applied to data recording, reproduction, and copy processing performed by using the first medium 110. The first media interface 506 performs, according to requests of the data processing unit 501, data writing and data reading processing, data copy processing, and the like performed by using the first medium 110.

The second media interface 507 is an interface applied to data recording and reproduction processing and copy processing performed by using the second medium 150. The second media interface 507 performs data writing and data reading processing, data copy processing, and the like performed by using the second medium 150.

The present invention has been explained in detail with reference to the specific embodiments. However, it is obvious that those skilled in the art can make modification and substitution of the embodiments without departing from the spirit of the present invention. In other words, the present invention has been disclosed in a form of illustration and should not be limitedly interpreted. To determine the gist of the present invention, the appended claims should be taken into account.

The series of processing explained in this specification can be executed by hardware, software, or a composite configuration of the hardware and the software. When processing by the software is executed, it is possible to install a computer program having a processing sequence recorded therein in a memory in a computer incorporated in dedicated hardware and cause the computer to execute the computer program. Alternatively, it is possible to install the computer program in a general-purpose computer, which can execute various kinds of processing, and cause the computer to execute the computer program. For example, the computer program can be recorded in a recording medium in advance. Besides installing the computer program in the computer from a recording medium, it is possible to receive the computer program via a network such as a LAN (Local Area Network) or the Internet and install the computer program in a recording medium such as a hard disk incorporated in the computer.

Various kinds of processing described in this specification is not always executed in time series according to the description of this specification and may be executed in parallel or individually according to a processing ability or necessity of the apparatus that executes the processing. In this specification, the system is a logical set configuration of plural apparatuses and is not limited to a system in which apparatuses having respective configurations are provided in the same housing.

As explained above, according to the configuration of the embodiment of the present invention, in the information processing apparatus that performs processing for copying recorded data of an information recording medium to another medium or the like, when data recorded in the recording medium at a copy source is encrypted unit data individually encrypted by a unit key corresponding to a unit, copy processing information (dealManifest), in which title information usable as index information of the unit is recorded, is acquired from the information recording medium or the management server. The information processing apparatus reads the title information in the copy processing information (dealManifest) acquired from the management server, selects the unit corresponding to the title information, executes decryption processing in unit of the unit by the selected unit key, and generates data for copy. With this configuration, it is possible to smoothly perform identification of the unit and acquisition processing of the unit key and quick copy processing is realized.

The present application contains subject matter related to that disclosed in Japanese Priority Patent Application JP 2009-288020 filed in the Japan Patent Office on Dec. 18, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:

at least one processor configured to generate data for copy of data recorded on an information recording medium, wherein the information recording medium has a configuration in which data encrypted by applying an individual unit key to each unit, which is segment data corresponding to an individual title, is recorded, and the at least one processor displays a copy permission list to a user to select the data recorded on the information recording medium for copy, acquires title information recorded in copy processing information acquired from the information recording medium or a management server, acquires a unit key corresponding to the acquired title information, and executes decryption processing for said each unit by the acquired unit key to generate the data for copy.

2. An information processing apparatus according to claim 1, wherein, when recorded data of the information recording medium is reproduction path designated content for performing reproduction conforming to a reproduction path selected according to the information processing apparatus, the at least one processor generates a segment key applied to decryption of a part of data forming the reproduction path and generates the data for copy according to decryption processing performed by using the generated segment key and the unit key.

3. An information processing apparatus according to claim 2, wherein the at least one processor acquires, according to processing to which a sequence key stored in a memory of the information processing apparatus is applied, identification information of a play list for enabling reproduction conforming to the reproduction path, reads out a play list file corresponding to the reproduction path from the information recording medium by applying the acquired identification information, and executes readout of data corresponding to the reproduction path by applying the play list.

4. An information processing apparatus according to claim 3, wherein the at least one processor reads out a play list file corresponding to the reproduction path from the information recording medium by applying a play list file name recorded in the copy processing information.

5. An information processing apparatus according to claim 1, wherein, when recorded data of the information recording medium is content code applied content including code information for executing verification processing for reproduction processing or conversion processing of reproduced data in data reproduction in the information processing apparatus, after executing processing to which the code information is applied, the at least one processor executes generation processing of the data for copy.

6. An information processing apparatus according to claim wherein the at least one processor starts generation processing of the data for copy on condition that an instruction for copy execution is input in a data reproduction period after application processing of the code information.

7. An information processing apparatus according to claim 1, wherein the at least one processor acquires a unit key identifier referring to the title and a unit key management table including corresponding data of unit key identification information and acquires a unit key from a unit key file, in which unit keys are stored, by applying the acquired unit key identifier.

8. A non-transitory information recording medium having stored thereon: encrypted data encrypted by applying a different unit key to each; a unit;

a unit key management table in which titles and unit key identifiers are associated;

a unit key file in which unit keys are stored; and copy processing information in which identification information of the titles is recorded, wherein the information recording medium makes it possible to, in an information processing apparatus that executes data4 or-copy generation processing of the encrypted data, acquire a unit key identifier from the unit key management table using the identification information of the titles recorded in the copy processing information, acquire a unit key corresponding to a copy target unit from the unit key file using the acquired unit key identifier, and perform decryption of the copy target unit, wherein the copy target unit is selected by a user from a copy permission list displayed by the information processing apparatus.

9. An information processing system comprising:

an information processing apparatus that generates data for copy of data recorded on an information recording medium; and a management server that provides copy permission information for the information processing apparatus, wherein the non-transitory information recording medium has a configuration in which data encrypted by applying an individual unit key to each unit, which is segment data corresponding to an individual title, is recorded, the management server provides, in response to a request from the information processing apparatus, a copy permission list and the information processing apparatus with copy processing information in which identification information of the tile is recorded, and the information processing apparatus display the copy permission list received from the management server to a user to select data recorded on the information recording medium for copy, acquires title information recorded in the copy processing information acquired from the server, acquires a unit key corresponding to the acquired title information, and executes decryption processing for said each unit by the acquired unit key to generate the data for copy.

10. An information processing method for generating data for copy of data recorded on an information recording medium in an information processing apparatus, the information recording medium having a configuration in which data encrypted by applying an individual unit key to each unit, which is segment data corresponding to an individual title, is recorded, the information processing method comprising the steps of:

causing a processor of the information processing apparatus to display a copy permission list to a user to select data recorded on the information recording medium for copy;

causing the processor of the information processing apparatus to acquire title information recorded in copy processing information acquired from the information recording medium or a management server; and causing the processor of the information processing apparatus to acquire a unit key corresponding to the acquired title information and execute decryption processing for said each unit by the acquired unit key to generate the data for copy.

11. A computer program for causing an information processing apparatus to generate data for copy of data recorded on an information recording medium, the information recording medium having a configuration in which data encrypted by applying an individual unit key to each unit, which is segment data corresponding to an individual title, is recorded, the computer program causing a data processing unit of the information processing apparatus to execute the steps of:

displaying copy permission list to a user to select the data recorded in the information recording medium for copy; acquiring title information recorded in copy processing information acquired from the information recording medium or a management server;

acquiring a unit key corresponding to the acquired title information; and executing decryption processing for said each unit by the acquired unit key to generate the data for copy.

* * * * *